United States Patent
Aoyama et al.

(10) Patent No.: US 8,427,773 B2
(45) Date of Patent: Apr. 23, 2013

(54) METHOD FOR MAGNETIC RECORDING USING MICROWAVE ASSISTED MAGNETIC HEAD

(75) Inventors: Tsutomu Aoyama, Tokyo (JP); Isamu Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 226 days.

(21) Appl. No.: 13/069,988

(22) Filed: Mar. 23, 2011

(65) Prior Publication Data

US 2012/0243117 A1 Sep. 27, 2012

(51) Int. Cl.
  *G11B 5/02* (2006.01)
(52) U.S. Cl.
  USPC .......................................................... 360/59
(58) Field of Classification Search .................. None
  See application file for complete search history.

(56) References Cited

U.S. PATENT DOCUMENTS

| | | | |
|---|---|---|---|
| 6,785,092 B2 | 8/2004 | Covington et al. | |
| 8,094,399 B2 * | 1/2012 | Roppongi et al. | 360/55 |
| 2007/0253106 A1 | 11/2007 | Sato et al. | |
| 2010/0073804 A1 | 3/2010 | Ikeda et al. | |
| 2010/0208379 A1 | 8/2010 | Ikeda et al. | |

FOREIGN PATENT DOCUMENTS

| | | |
|---|---|---|
| JP | A-2010-003339 | 1/2010 |
| JP | A-2010-182347 | 8/2010 |

* cited by examiner

*Primary Examiner* — Daniell L Negron
(74) *Attorney, Agent, or Firm* — Posz Law Group, PLC

(57) ABSTRACT

An object is to provide a magnetic recording method that demonstrates an additional high assistance effect to magnetic recording by applying an alternate current magnetic field in the in-plane direction to a magnetic recording medium having a large coercive force, and a method of the present invention for magnetic recording using a magnetic recording head to a recording layer of a magnetic recording medium arranged to oppose the magnetic recording head, the magnetic recording head including a main pole, an auxiliary pole, a main coil for generating a perpendicular recording magnetic field to the main pole, and either a sub-coil for generating an in-plane alternate current magnetic field of a microwave band to the main pole or a microwave radiator that is arranged in vicinity of the main pole and that radiates microwaves, the method including: a step for modulating an amplitude of the in-plane alternate current magnetic field by modulating an amplitude of microwave alternating current that is applied to either the sub-coil or the microwave radiator using a modulation signal wave so that a ratio (fc/fm) of a carrier frequency (fc) to a modulation frequency (mf) is from 10 to 40; and a step for performing magnetic recording to the recording layer of the magnetic recording medium by applying the perpendicular recording magnetic field while applying the in-plane alternate current magnetic field with the modulated amplitude to the magnetic recording medium.

4 Claims, 21 Drawing Sheets

METHOD FOR MAGNETIC RECORDING USING MICROWAVE ASSISTED MAGNETIC HEAD

BACKGROUND OF THE INVENTION

1. Field of the Invention

The present invention relates to a method for magnetic recording using a microwave assisted magnetic head to write data signals on magnetic recording media having a large coercive force to stabilize the magnetization.

2. Description of the Related Art

In association with an advance of high density recording, bit cells for recording digital information on magnetic recording media are miniaturized. As a result, since signals detected by a reproducing element of a magnetic head fluctuate due to so-called thermal fluctuation, a signal-noise ratio (S/N) may be deteriorated or the signal may be lost in the worst case.

Therefore, in recent years, miniaturizing magnetic nanoparticles that configure a recording layer while at the same time raising the magnetic anisotropy energy Ku that pins the magnetic direction of magnetic nanoparticles has been effective at solving the above problem in a magnetic recording medium that uses a practical perpendicular recording system. A thermal stability index S that corresponds to the thermal fluctuation is expressed by the following formula, and normally the thermal stability index S value of at least 50 is said to be required.

$$S = Ku \cdot V / kB \cdot T$$

In the above equation, Ku is the "magnetic anisotropy energy," "V is the "volume of magnetic nanoparticles configuring the recording layer," kB is the "Boltzmann Constant," and T is the "absolute temperature."

However, according to the so-called Stoner-Wohlfarth model, because the magnetic field (magnetization reversal field) Hsw required for recording information is proportional to Ku, raising the Ku causes an increase in Hsw.

To form a reversal of magnetization of the recording layer corresponding to a desired data sequence, it is necessary to apply a recording magnetic field having an intensity that exceeds Hsw that changes steeply. For magnetic disk devices (or hard disk drive, HDD), which are utilized in practice in recent years because of the perpendicular recording system, a recording element with a so-called single magnetic pole is utilized. A recording magnetic field is applied, which is perpendicular to a recording layer from a surface of an air bearing surface (ABS).

This intensity of a perpendicular recording magnetic field is proportional to a saturation magnetic flux density Bs of a soft magnetic material forming the single magnetic pole. Therefore, materials having a saturation magnetic flux density Bs as high as possible are developed and utilized in practice. However, according to the so-called Slater-Pauling curve, Bs=2.4 T (tesla) is a limit of the saturation magnetic flux density Bs for practical use, and currently it is approaching the limit for practical use. A thickness and/or a width of a current single magnetic pole is approximately 100-200 nm. In order to increase a recording density, further reduction of the thickness and/or width is required, and the perpendicular magnetic field generated with such a minute magnetic pole tends to be reduced.

For these reasons, it can be said that the recording ability of the ordinary data writing element is approaching the limit, and that difficulties are faced to achieve the high density recording.

Therefore, a so-called thermal assisted magnetic recording (TAMR) has been proposed. With the TAMR, the recording layer is irradiated with laser light etc., the temperature of the recording layer is increased, and signals are recorded in a situation where the coercive force of the recording layer is lowered.

However, there are the following problems even for the TAMR. (1) A magnetic head providing a magnetic element and an optical element is required so that the configuration thereof is extremely complex and expensive. (2) It is required to develop a recording layer which has a coercive force with a highly sensitive temperature characteristic. (3) Due to a thermal demagnetization during a recording process, adjacent track erasures may occur and/or a recording condition becomes unstable.

In the meantime, research on spin transfer during electron conductivity has been progressing, targeting increased sensitivity of GMR heads and TMR heads as reading elements. Research has been initiated to apply this to magnetization reversal of a recording layer of a magnetic recording medium and to reduce the perpendicular magnetic field required for the magnetization reversal.

Here, a high frequency alternate current magnetic field in an in-plane direction of the magnetic recording medium is applied simultaneously with a perpendicular magnetic field for recording. The frequency of the alternate current magnetic field applied in the in-plane direction is an ultra high frequency (a few up to 40 GHz) of a microwave band that corresponds to a ferromagnetic resonance (also referred to as FMR hereinafter) frequency of magnetic nanoparticles that configure the recording layer of the magnetic recording medium.

Further, analysis results are reported that a reduction in the magnetization reversal field Hsw of the recording layer of about 60% is possible by the simultaneous application of the alternate current magnetic field in the in-plane direction. With the practical use of this method, a configuration that uses a complicated TAMR is not necessary, and it becomes possible to raise the Ku of the recording layer of the magnetic recording medium so that a considerable improvement in recording density is expected.

The phenomenon to decrease the magnetization reversal field appears as the result of precession movement of the spin of the magnetic nanoparticles being excited by the application of an alternate current magnetic field of a frequency close to the spin FMR frequency of the magnetic nanoparticles that configure the recording layer.

However, the spin FMR frequency changes sequentially according to the angle from the easy magnetization axis of the spin. Therefore, by merely applying a single frequency sine wave, the effect of exciting the precession movement is demonstrated only when the spin is at a specific angle in the process of achieving magnetization reversal. In addition, the effect of exciting the precession movement is not demonstrated at other angles of spin because the frequency of the alternate magnetic field does not match the FMR frequency.

Ideally, sequentially changing the assisting microwave frequency by the angle of spin within the precession movement when tracking would be the best method. However, because one cycle of precession movement is a short cycle of 1 ns or less, achieving synchronization and tracking the frequency change of the microwave within this cycle is unrealistic.

To alleviate this type of deficiencies, a method has also been proposed to apply a frequency modulated wave (hereinafter also referred to as an FM wave) to a magnetic recording medium (Japanese Laid-Open Patent Application No. 2010-3339, Tohoku University). However, because single frequency modulation is used, the energy in the spectrum of the FM wave is not uniform and contains gaps. The assistance effect is extremely small when the FMR frequency of magnetic nanoparticles that configure the recording layer enters the gaps in the modulation frequency in this so-called comb-shape state.

In addition, use of an FM wave of the single frequency signal is not desirable as the spectrum intensity weakens when the frequency separates from the center frequency with the FM wave of the single frequency signal, and as the energy of the center frequency may become zero at a certain modulation index.

Furthermore, even if a microwave of an FM wave having a uniform frequency is applied to the magnetic recording medium, the magnetization reversal time is long (approximately about 2 ns), making high speed recording difficult. In addition, when the FM wave is applied, there is a problem that the convergence time for magnetization reversal is lengthened compared to when a microwave having a uniform frequency is applied.

SUMMARY OF THE INVENTION

Terminologies used in the present specification is defined prior to giving a description of the present invention. In the present specification, the dimension in the X-direction illustrated in the drawings represents the "width," the dimension in the Y-direction represents the "length," and the dimension in the Z-direction represents the "thickness" or "height," respectively. Further, the side near the air bearing surface (the surface of the magnetic head that opposes the magnetic recording medium) in the Y-direction is expressed as "forward," and the opposite side is expressed as "rearward." Further, the direction for the rising accumulation of a multilayer film is expressed as "upward" or "upper side", and the opposite direction is referred to as "downward" or "lower side".

The present invention has an object to provide a magnetic recording method that demonstrates an additional high assistance effect to magnetic recording by applying an alternate current magnetic field in the in-plane direction to a magnetic recording medium having a large coercive force.

In order to achieve the object, the present invention provides a method for magnetic recording using a magnetic recording head to a recording layer of a magnetic recording medium arranged to oppose the magnetic recording head, the magnetic recording head including a main pole, an auxiliary pole, a main coil for generating a perpendicular recording magnetic field to the main pole, and either a sub-coil for generating an in-plane alternate current magnetic field of a microwave band to the main pole or a microwave radiator that is arranged in vicinity of the main pole and that radiates microwaves, the method including: a step for modulating an amplitude of the in-plane alternate current magnetic field by modulating an amplitude of microwave alternating current that is applied to either the sub-coil or the microwave radiator using a modulation signal wave so that a ratio (fc/fm) of a carrier frequency (fc) to a modulation frequency (fm) is from 10 to 40; and a step for performing magnetic recording to the recording layer of the magnetic recording medium by applying the perpendicular recording magnetic field while applying the in-plane alternate current magnetic field with the modulated amplitude to the magnetic recording medium (First Invention).

In the invention (First Invention), in the step for modulating the amplitude of the in-plane alternate current magnetic field, a degree of modulation is preferably from 0.5 to 3.2, more preferably from 0.7 to 1.8 when the amplitude of the microwave alternating current is modulated (Second Invention). When the perpendicular recording magnetic field is applied to the magnetic recording medium in the step for performing magnetic recording, the amplitude of the microwave alternating current is preferably modulated so that the amplitude of the microwave alternating current after amplitude modulation is maximized (Third Invention). The recording layer of the magnetic recording medium is preferably configured of material having magnetic anisotropy energy of $1 \times 10^6$ erg/cm$^3$ or greater (Fourth Invention).

Moreover, the "carrier frequency" in the present invention means a frequency of a microwave band of a microwave alternating current (carrier wave). The "modulation frequency" means a frequency of a modulation signal wave (modulation wave) used to modulate the amplitude of the microwave alternating current. Further, the "perpendicular recording magnetic field" means a magnetic field applied in a nearly perpendicular direction in relation to a lamination layer plane of the recording layer of the magnetic recording medium. The "in-plane alternate current magnetic field" means a magnetic field applied in a nearly parallel direction in relation to a lamination layer plane of the recording layer of the magnetic recording medium. In addition, "degree of modulation" means the value of K within the below Equation (1) when the waveform f(t) of the amplitude modulated microwave alternating current (carrier wave) is expressed as by Equation (1). When the degree of modulation is K=1, it is called complete modulation, and when the degree of modulation is K>1, it is called overmodulation. The larger the value of the degree of modulation K, the larger the instantaneous power of the carrier wave.

$$f(t) = A_0\{1 + K\cos(2p \cdot fm \cdot t)\} \cos(2p \cdot fc \cdot t) \tag{1}$$

In Equation (1), $A_0$ indicates the "amplitude of the carrier wave"; fc indicates the "frequency (carrier frequency) of the microwave alternating current (carrier wave)"; and fm indicates the frequency (modulation frequency) of the modulation signal wave (modulation wave).

According to the present invention, a magnetic recording method is provided that can demonstrate an additional high assistance effect to magnetic recording by applying an alternate current magnetic field in the in-plane direction to a magnetic recording medium having a large coercive force.

DESCRIPTION OF THE PREFERRED EMBODIMENTS

Figure 1:
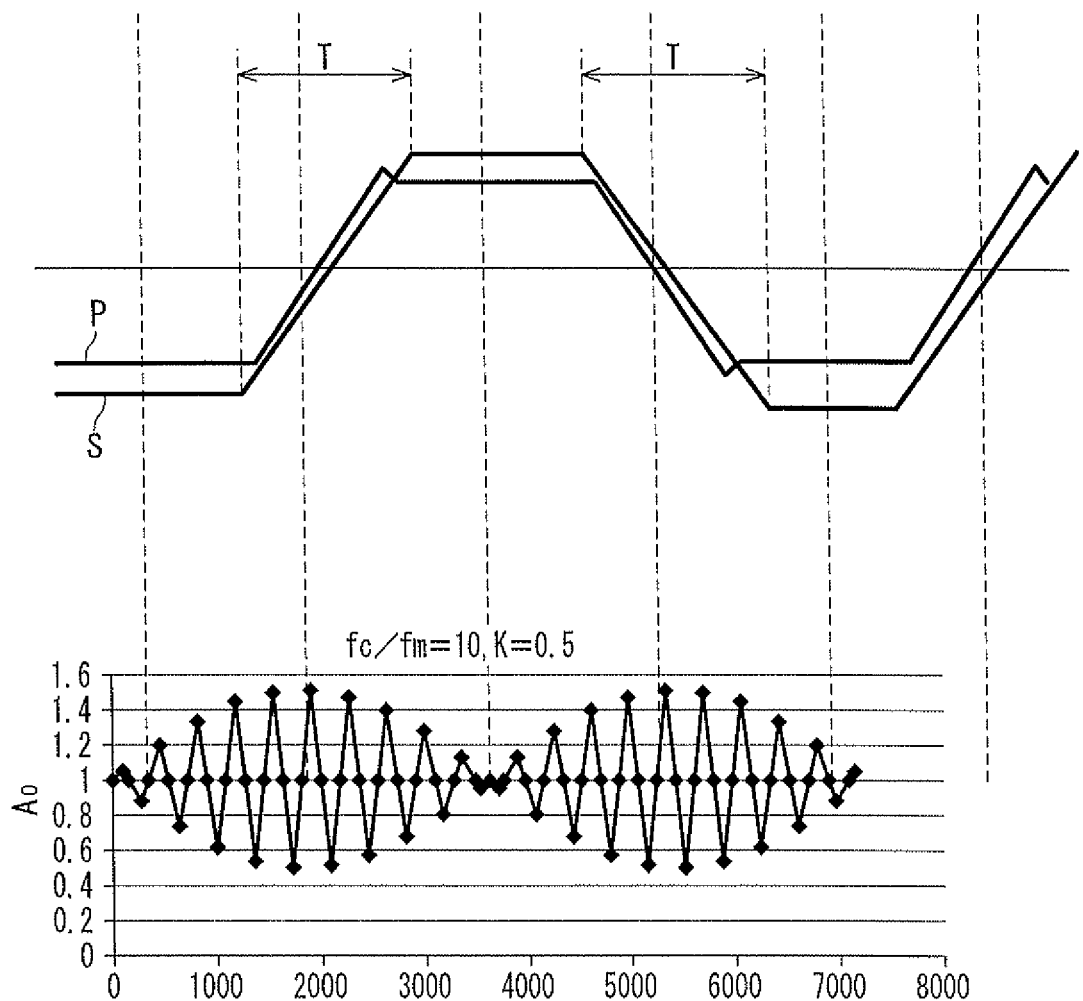
FIG. 1 illustrates a waveform of amplitude modulated microwave alternating current, a waveform of current supplied to a main coil, and a rising waveform of raised by magnetic flux by a main pole according to a magnetic recording method that relates to one embodiment of the present invention.

A description is provided of the magnetic recording method that relates to one embodiment of the present invention.

[Magnetic Recording Method]

First, a description is provided of the main parts of a magnetic recording method according to the present embodiment.

The magnetic recording method according to the present embodiment uses a magnetic recording head provided with a main pole, an auxiliary pole, a main coil for generating a perpendicular recording magnetic field at the main pole, and a microwave radiator that radiates microwaves provided in the vicinity of the main pole or a sub-coil for generating an in-plane alternate current magnetic field of a microwave band to the main pole. The magnetic recording method includes a step for modulating the amplitude of an in-plane alternate current magnetic field, and a step for magnetically recording to a recording layer of the magnetic recording medium by applying a perpendicular recording magnetic field while applying the in-plane alternate current magnetic field with modulated amplitude to the magnetic recording medium.

In the present embodiment, the amplitude of the microwave alternating current (carrier wave) having a frequency (carrier frequency, fc) in the microwave band is modulated by a modulation signal wave (modulation wave) having a predetermined frequency (modulation frequency, fm). Further, the amplitude modulated microwave alternating current (high frequency wave of which the amplitude is modulated) is applied to the sub-coil or the microwave radiator. A modulation signal wave having a modulation frequency (fm) is used at the time of modulating the amplitude of the microwave alternating current so that the carrier frequency (fc) to modulation frequency (fm) ratio (fc/fm) is within a predetermined range. Therefore, the amplitude of the in-plane alternate current magnetic field generated by the main pole can be modulated, and the generation of the in-plane alternate current magnetic field by the main pole can be easily controlled.

A ratio (fc/fm) of the carrier frequency (fc) to modulation frequency (fm) at the time of modulating the amplitude of the microwave alternating current applied to the sub-coil or microwave radiator is 10 to 40, or preferably 10 to 20. When the ratio (fc/fm) is less than 10, excitation of the precession movement of the spin of the magnetic nanoparticles that configure the recording layer of the magnetic recording medium becomes difficult. Further, the polarity of the microwave alternating current after the magnetization reversal of the recording layer becomes single polarity, and magnetization reversal cannot stably converge. In addition, when the ratio (fc/fm) exceeds 40, the application of the microwave alternating current to the sub-coil or a microwave radiator becomes difficult. More specifically, maintaining the ratio (fc/fm) within the above range allows the convergence time for magnetization reversal of the recording layer to be shortened, which results in faster data writing.

Moreover, the carrier frequency (fc) is preferably a frequency equal to, or close to, the ferromagnetic resonance (FMR) frequency of the recording layer of the magnetic recording medium which is the recording target. More specifically, the carrier frequency (fc) is preferably 10 to 40 GHz. With the carrier frequency (fc) within the above range, the frequency of the in-plane alternate current magnetic field applied to the magnetic recording medium can be within a similar range, and by applying the in-plane alternate current magnetic field of such frequency to the magnetic recording medium, the magnetization reversal field of the recording layer of the magnetic recording medium can be greatly reduced.

Figure 27:
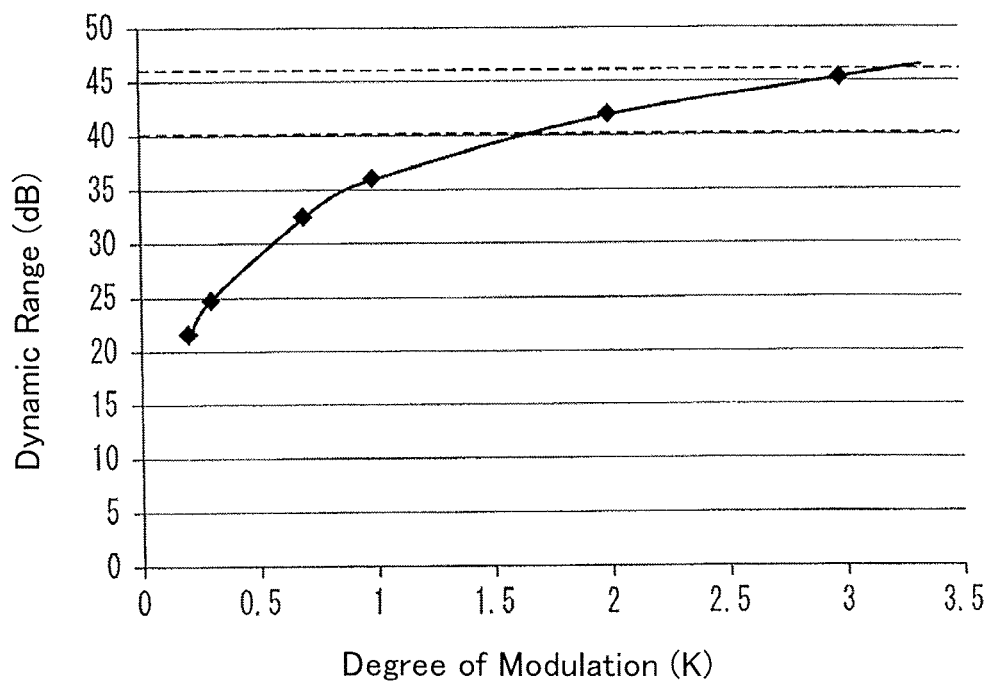
FIG. 27 is a graph illustrating the relationship between the dynamic range and the degree of modulation (K) for amplitude modulated microwave alternating current.

The degree of modulation (K) at the time of modulating the amplitude of the microwave alternating current is preferably 0.5 to 3.2 and more preferably 0.7 to 1.8. When the degree of modulation (K) is less than 0.5, the ratio (dynamic range) of the maximum amplitude to the minimum amplitude of the microwave alternating current after the modulation is small and presents a risk of not achieving the desired assistance effect. On the other hand, because the instantaneous power of the carrier wave increases with an increase in the degree of modulation, it is assumed that a stronger assistance effect can be obtained as the degree of modulation increases. Here, the amplitude modulated microwave alternating current is normally applied to the sub-coil or the microwave radiator after being amplified by a current amplifier, for example. However, if the amplitude of the microwave alternating current is modulated by the degree of modulation that exceeds the maximum value of the dynamic range allowed by the current amplifier, the current value of the microwave alternating current applied to the sub-coil or the microwave radiator becomes saturated, and the waveform of the output current (the amplitude modulated and amplified microwave alternating current applied to the sub-coil or microwave radiator) from the current amplifier becomes distorted. Accordingly, the degree of modulation is appropriately set so as to not exceed the dynamic range allowed by the current amplifier. As evident in the graph of FIG. 27 expressing the relationship between the dynamic range and degree of modulation (K), when the maximum value of the dynamic range allowed by the current amplifier is 40 dB, for example, the maximum degree of modulation (K) can be set at 1.8. When the maximum value of the dynamic range is 46 dB, the maximum value for the degree of modulation (K) can be set at 3.2.

The method for modulating the amplitude of the microwave alternating current is not particularly restricted, and conventionally known methods can be applied. However, a method that generates an upper sideband (USB) or a lower sideband (LSB) by a single sideband method (SSB) is preferred. In this case, examples of the method that generates the USB or LSB by the SSB method include, for example, a filter method, a phase shift network (PSN) method, Weber method or the like. In addition, when the USB or LSB is generated by the SSB method, it is preferable to set the frequency of the USB or LSB to be generated to a frequency that is equivalent to, or close to, the ferromagnetic resonance (FMR) frequency of the recording layer.

As illustrated in FIG. 1, it is preferable that the amplitude of the microwave alternating current is modified so that the amplitude of the microwave alternating current applied to the sub-coil or the microwave radiator is maximized while (within the magnetization reversal time T) the perpendicular recording magnetic field generated by the main pole is applied to the magnetic recording medium. More preferably, the amplitude of the microwave alternating current is modulated so that the amplitude of the microwave alternating current is minimized at the time of the initial supply of current to the main coil and at the time the rising of the magnetic flux by the main pole is completed and so that the amplitude of the microwave alternating current is maximized at the time of the midpoint thereof. As a result, the magnetization reversal field of the recording layer can be greatly reduced because the in-plane alternate current magnetic field applied to the magnetic recording medium can be increased. In FIG. 1, the graph toward the top of the drawing illustrates the waveform P of the current supplied to the main coil and the rising waveform S of the magnetic flux by the main pole. The graph at the bottom illustrates the waveform of the microwave alternating current after amplitude modulation that is supplied to the sub-coil. The vertical axis in the microwave alternating current waveform represents standardized amplitude $A_0$, while the horizontal axis represents time (discretionary scale).

In this manner, the perpendicular recording magnetic field is generated while an in-plane alternate current magnetic field is generated from the main pole, and the in-plane alternate current magnetic field and the perpendicular recording magnetic field are applied to the magnetic recording medium. The in-plane alternate current magnetic field is a high frequency, and therefore, the application is limited to the surface layer portion of the magnetic recording medium due to the skin effect, thereby enabling the magnetization reversal field of the recording layer to be greatly reduced. In addition, because the amplitude of the microwave alternating current applied to the sub-coil or microwave radiator is maximized while the perpendicular recording magnetic field is applied (during the magnetization reversal time), the amplitude of the in-plane alternate current magnetic field generated simultaneously with the perpendicular recording magnetic field by the main pole is maximized. Therefore, the magnetization reversal field of the recording layer can be further greatly reduced. Accordingly, even if the material of the recording layer of the magnetic recording medium has magnetic anisotropy energy of $1\times10^6$ erg/cm$^3$ and has a recording layer with a large coercive force, magnetization reversal and demagnetization in the recording layer are still made possible by the applied perpendicular recording magnetic field. As a result, high density recording of data becomes possible, and recording accuracy and recording quality can be improved.

[Magnetic Recording Device]

Next, a description is given of the structure of the magnetic recording device suitably used when implementing the magnetic recording method that relates to the present embodiment.

The magnetic recording device in the present embodiment includes the magnetic head and a magnetic recording medium.

(Magnetic Recording Medium)

Figure 2:
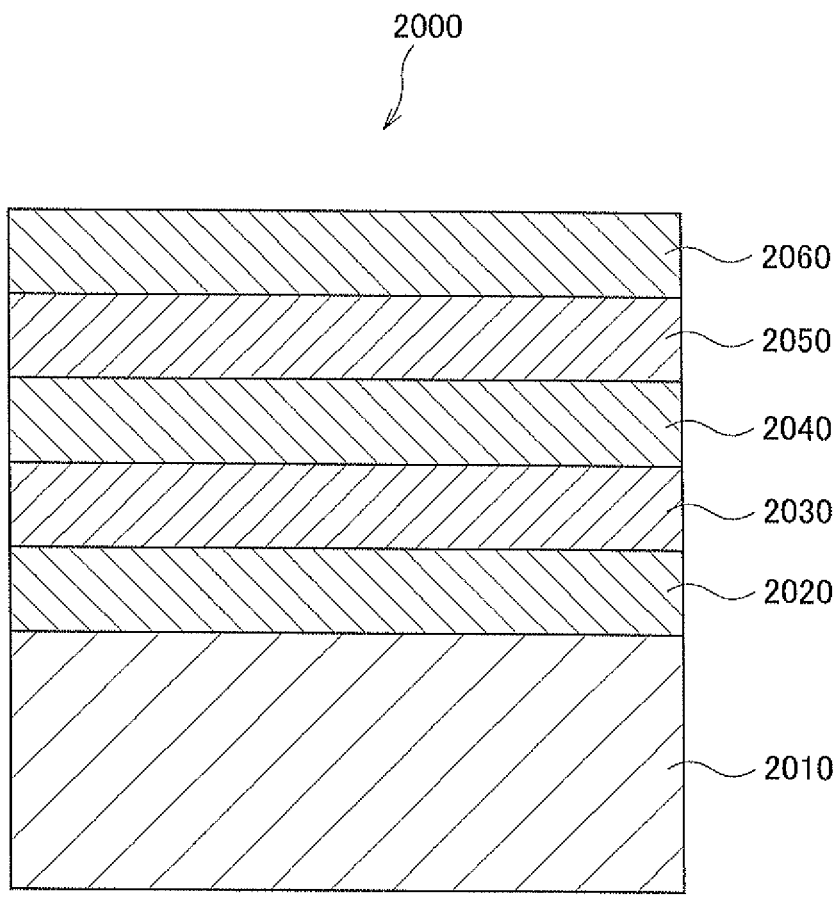
FIG. 2 is a cross-sectional view illustrating a multilayer structure of a magnetic recording medium in one embodiment of the present invention.
Figure 3:
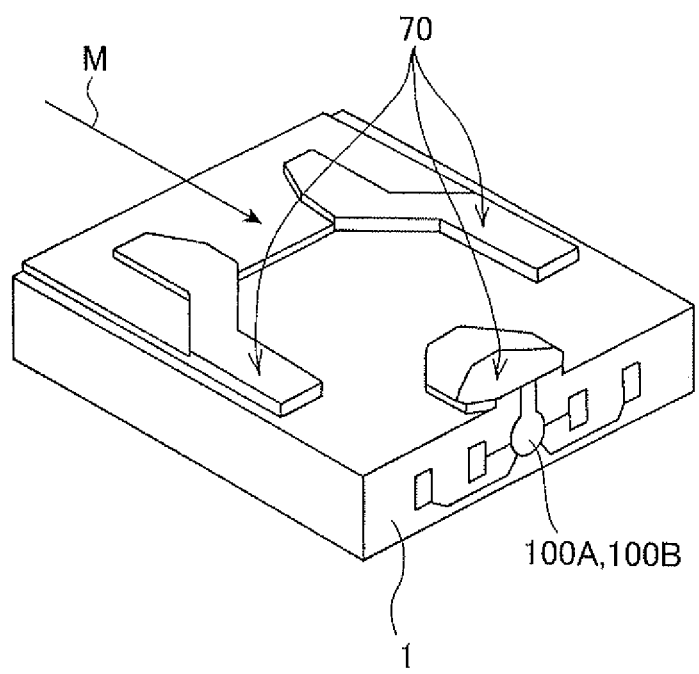
FIG. 3 is a perspective view schematically illustrating the overall structure of a magnetic head in one embodiment of the present invention.

The magnetic recording medium is not particularly restricted, but, as illustrated in FIG. 2, the magnetic recording medium 2000 can suitably include a lamination structure laminated on a substrate 2010 configured of a glass substrate, a laminated substrate in which a Ni—P layer is laminated on an Al alloy layer, or the like in the following order: a soft magnetic under layer 2020 made of a FeCoTaZr layer, FeCoB layer, CoTaZr layer or the like; an intermediate layer 2030 made of an Ru layer, a PdPt layer, an MgO layer or the like, with a thickness of about 10 to 25 nm; a recording layer 2040; a protective layer 2050 made of carbon, particularly DLC or the like, with a thickness of about 2 to 5 nm; and a lubrication layer 2060 made of a layer or the like that includes perfluoropolyether, with a thickness of about 1 to 3 nm.

The recording layer 2040 is configured, for example, of a CoCrPt—SiO$_2$ granular recording layer, a laminated superlattice film with a plurality of layers (approximately 20 layers) of (Co/Pd) alternately laminated, an FePd layer, a CoPtCro layer, and a CoPt—TiO$_2$ layer, or the like, and the thickness thereof can be between approximately 10 to 25 nm.

The magnetic anisotropy energy of the material that configures the recording layer 2040 is preferably a minimum of $1\times10^6$ erg/cm$^3$, and is particularly preferred to be a minimum of $5 \times 10^6$ erg/cm$^3$. The material of the recording layer 2040 of the magnetic recording medium 2000 has high magnetic anisotropy energy. Therefore, even if it has a large coercive force, magnetization reversal or demagnetization of the recording layer can be efficiently performed according to the magnetic recording method that relates to the present embodiment.

Moreover, the magnetic recording medium in the present embodiment can also be a bit patterned medium which is a magnetic recording medium according to a magnetic recording method that assigns one bit of data to one magnetic region.

(Magnetic Head)

FIG. 3 to FIG. 7 illustrate an example of a configuration of the magnetic head according to the present embodiment. Descriptions of the sub-coil and microwave radiator made of a minute linear structure are omitted due to limitations in the size of the paper surfaces in these drawings.

The magnetic head according to the present embodiment, as illustrated in FIG. 3 to FIG. 6, has a slider base substrate 1 in a nearly rectangular structure. The slider base substrate 1 has an air bearing surface 70 that directly contributes to the flying characteristics, and is provided with a reproducing head part 100A that utilizes a magnetoresistive effect (MR) and recording head part 100B that executes a recording process with a perpendicular recording system, on the side end surface residing at the air outflow end side (trailing edge side) in the airflow direction M (same direction as the essential linear movement direction of the magnetic recording medium). A thin-film magnetic head is configured with lamination in the following order on the slider base substrate 1: an insulating film 2, the reproducing head part 100A, the recording head part 100B, and a non-magnetic film 21 that makes up the overcoat film.

(Reproducing Head)

The reproducing head part 100A is configured by laminating in order, a lower read shield film 3, a shield gap film 4, and an upper read shield film 30. A reproducing head element (MR element 8) is embedded in the shield gap film 4 so as to be exposed to the air bearing surface 70 (see FIG. 5).

The lower read shield film 3 and the upper read shield film 30 are both configured to extend in the rearward direction from the air bearing surface 70 and magnetically separate the MR element 8 from the surroundings. The lower read shield film 3 is configured from a magnetic material such as nickel iron alloy (NiFe) or the like. The upper read shield film 30 is configured, for example, by laminating two upper read shield film parts 5 and 7 sandwiching a nonmagnetic film 6. Both of the upper read shield film parts 5 and 7 are configured from a magnetic material such as nickel iron alloy (NiFe) or the like. The nonmagnetic film 6 is configured, for example, from a nonmagnetic material such as ruthenium (Ru) or alumina. Moreover, the upper read shield film 30 is not restricted to a three layer structure as described above, but may have a structure made from a single layer configured, for example, from a magnetic material such as nickel iron alloy (NiFe) or the like.

The shield gap film 4 is configured, for example, from a nonmagnetic insulating material such as alumina or the like, and electrically separates the MR element 8 from the surroundings. The MR element 8 is configured from an element such as a giant magneto-resistive effect (GMR) element that utilizes a giant magneto-resistive effect, or a tunneling magneto-resistive effect (TMR) element that utilizes a tunneling magneto-resistive effect.

(Recording Head)

The recording head part 100B includes a nonmagnetic film 11, a pole film 50, a magnetic gap film 16 provided with a magnetic coupling opening part (back gap 16BG), a recording coil (main coil) 18 embedded within an insulating film 19, a magnetic film 60, a first write shield film 15, and a second write shield film 17.

The nonmagnetic film 11 electrically and magnetically separates an auxiliary pole film 10 from the surroundings and is configured, for example, from a nonmagnetic material such as alumina.

The pole film 50 extends in the rearward direction from the air bearing surface 70 and includes the auxiliary pole film 10 and a main pole film 40. Depending on the design specification, the auxiliary pole film 10 and the main pole film 40 can be arranged vertically inverted (Z direction). In addition, the coupling magnetic layer formed on the magnetic coupling opening part (backgap 16BG) may also be referred to as a coupling yoke 20*a*.

Figure 4:
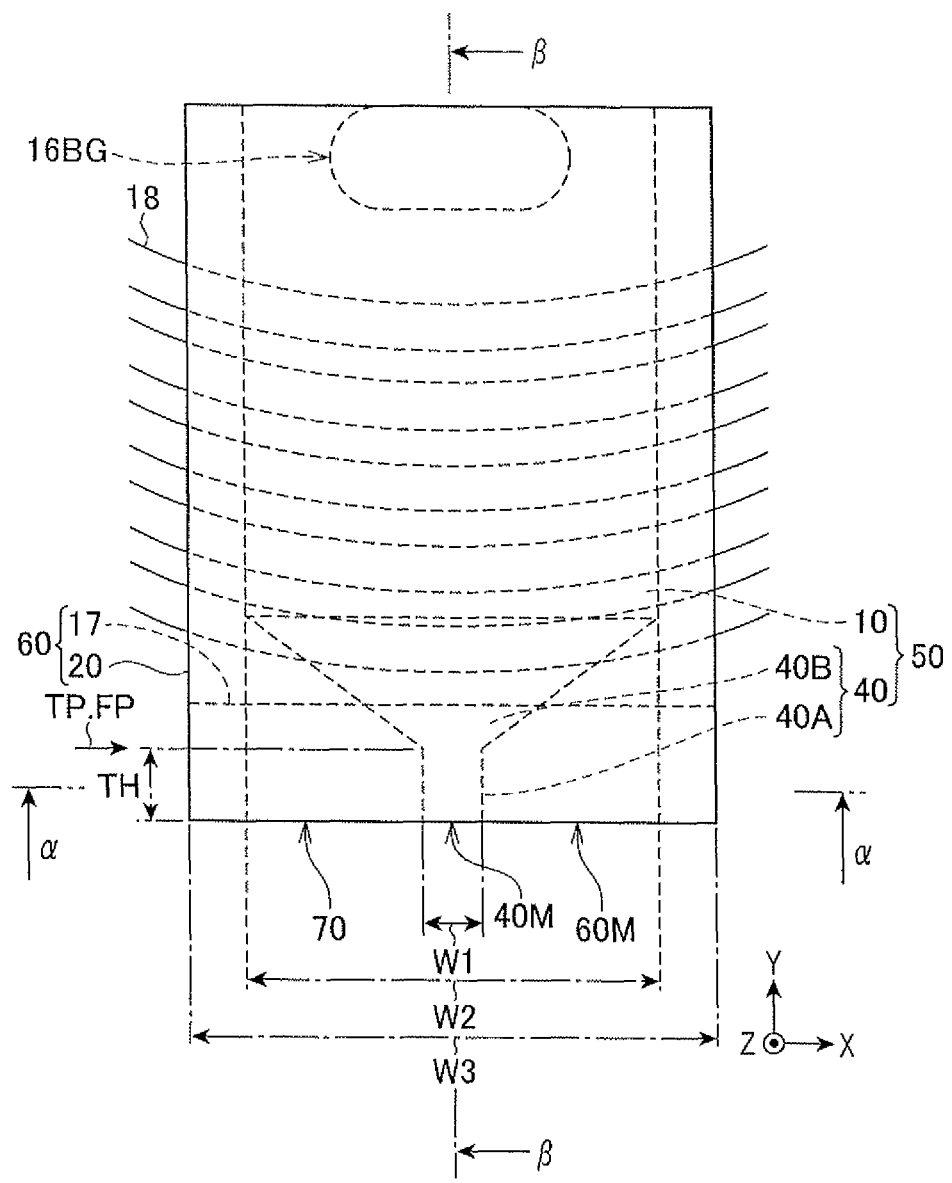
FIG. 4 is a plan view illustrating a recording head part of the magnetic head in one embodiment of the present invention.

The auxiliary pole film 10 extends from a position away from the air bearing surface 70 to the backgap 16BG. The auxiliary pole film 10 is arranged, for example, at the leading side relative to the main pole film 40 and includes, as illustrated in FIG. 4, a rectangular planar shape (width W2). The auxiliary pole film 10 may be arranged to the trailing side of the main pole film 40 as described above.

The main pole film 40 extends from the air bearing surface 70 to the backgap 16BG. The main pole film 40 includes, for example, as illustrated in FIG. 4, a narrow width writing pole 40A that extends rearward from the air bearing surface 70, and a wide width body part 40B that continues from the rear side of the writing pole 40A.

The writing pole 40A is a substantive emitting part of the magnetic flux (so-called pole film) and has a constant width W1 that regulates the recording track width. The body part 40B is a part that supplies the magnetic flux to the writing pole 40A and has a width W2 that is larger than the width W1. The width of the body part 40B narrows gradually towards the writing pole 40A in the front. The position at which the width of the main pole film 40 begins to widen from the width W1 to the width W2 is called a flare point FP.

The main pole film 40 is in an inverse trapezoidal shape in which the end surface 40M on the side closer to the air bearing surface 70 makes the long edge positioned on the trailing side to be a top and the short edge positioned on the leading side to be a bottom, respectively. The top end edge of the trapezoidal shape is the substantive recording location.

The magnetic gap film 16 is a gap for magnetically separating the pole film 50 and the magnetic film 60 and is configured, for example, from a nonmagnetic insulating material, such as alumina or the like, or a nonmagnetic conductive material, such as ruthenium or the like.

The recording coil (main coil) 18 generates a magnetic flux for magnetic recording onto the magnetic recording medium 2000 and is configured, for example, from a highly conductive material, such as copper (Cu) or the like. The recording coil (main coil) 18, as illustrated in FIG. 4, includes a spiral structure that is wound centrally around the backgap 16BG (coupling yoke 20*a*). In addition, the recording coil (main coil) 18 is connected by recording coil bonding pads 18*a* and 18*b*.

The insulating film 19 electrically separates the recording coil (main coil) 18 from the surroundings and is configured, for example, from a nonmagnetic insulating material, such as a photoresist, a spin-on-glass (SOG) or the like that exhibit flow properties when applying heat. The frontmost end position of the insulating film 19 is the throat-height-zero position TP. The distance between the throat-height-zero position TP and the air bearing surface 70 is referred to as a throat height TH. Furthermore, FIG. 4 illustrates a case in which the throat-height-zero position TP matches the flare point FP.

The magnetic film 60 makes the gradient of the perpendicular magnetic field steep by capturing the components spreading out from the magnetic flux emitted from the pole film 50, while at the same time, circulating the magnetic flux between the recording head 100B and the magnetic recording medium 2000 by capturing the magnetic flux that returns from the magnetic recording medium 2000. As the magnetic film 60 extends rearward from the air bearing surface 70 on the trailing side of the pole film 50, the magnetic film 60 is isolated from the pole film 50 by the magnetic gap film 16 at the front side thereof and is coupled to the pole film 50 through the backgap 16BG in the rear side. The end surface 60M of the magnetic film 60 on the side near the air bearing surface 70 is, for example, in a rectangular shape with a width W3 that is larger than the width W1 as illustrated in FIG. 4. The magnetic film 60 includes, for example, a second write shield film 17 and a return yoke film 20 being made up of mutually separate bodies.

The first and second write shield films 15 and 17 mainly provide a function for increasing the perpendicular magnetic field gradient and are configured, for example, from a magnetic material having a high saturation magnetic flux density, such as nickel iron alloy, ferroalloy or the like. The first and second write shield films 15 and 17 configure a so-called wrap-around structure. In addition, these films, including the magnetic film 20, are referred to as trailing shields 200 in the present embodiment. Furthermore, a notched part is formed on the air bearing surface of the trailing shield 200 on a corresponding location so that the writing pole 40A that is the tip end of the main pole film 40 can be exposed to the air bearing surface.

Figure 5:
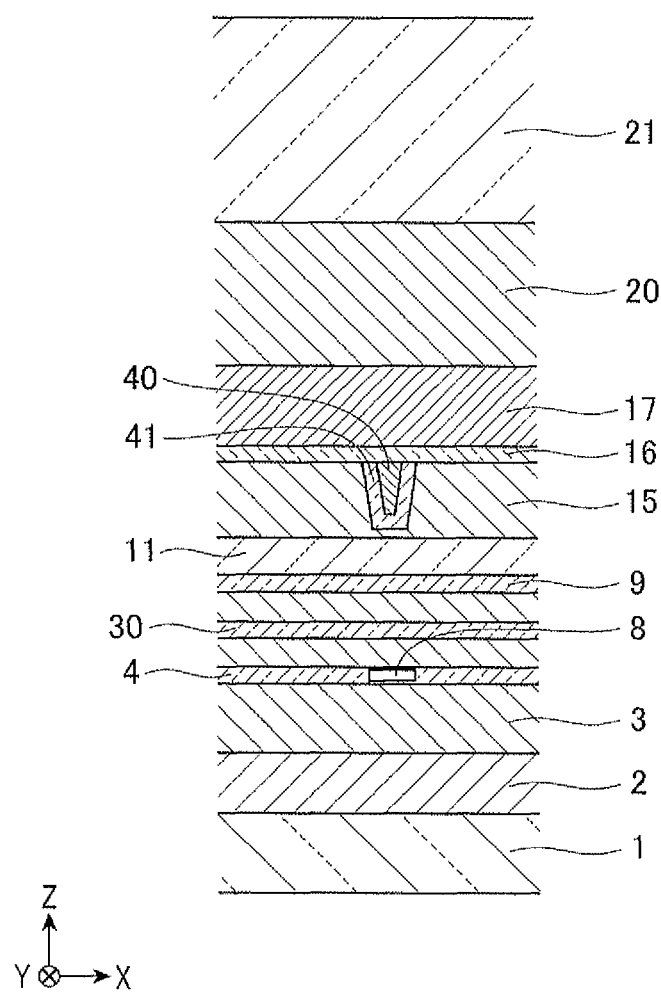
FIG. 5 is a cross-sectional view along line α-α in FIG. 4 for the magnetic head in one embodiment of the present invention.

In the wrap-around structure illustrated in FIG. 5, the first write shield film 15 is adjunct, via the magnetic gap film 41, to both side surfaces of the air bearing surface side of the writing pole 40A that configures the main pole film 40. Accordingly, a side shield film is formed on both sides of the writing pole 40A by the first write shield film 15.

Further, the second write shield film 17 is adjunct, via the magnetic gap film 16, to the top surface of the ABS side of the writing pole 40A. The second write shield film 17 is also called a pedestal yoke, and the magnetic gap film 16 sandwiched between the second write shield film 17 and the top surface of the writing pole 40A forms the writing gap.

As a result of the arrangement described above, the first and second write shield films 15 and 17 capture the spreading components of the magnetic flux emitted from the pole film 50 thereby increasing the magnetic field gradient of the perpendicular magnetic field and narrowing the recording width.

The second write shield film 17 extends in the rearward direction from the air bearing surface 70 while being adjunct to the magnetic gap film 16, and is adjunct to the insulating film 19 at the rear end thereof. In this manner, the second write shield film 17 performs the role of regulating the frontmost position (throat-height-zero position TP) of the insulating film 19.

Figure 6:
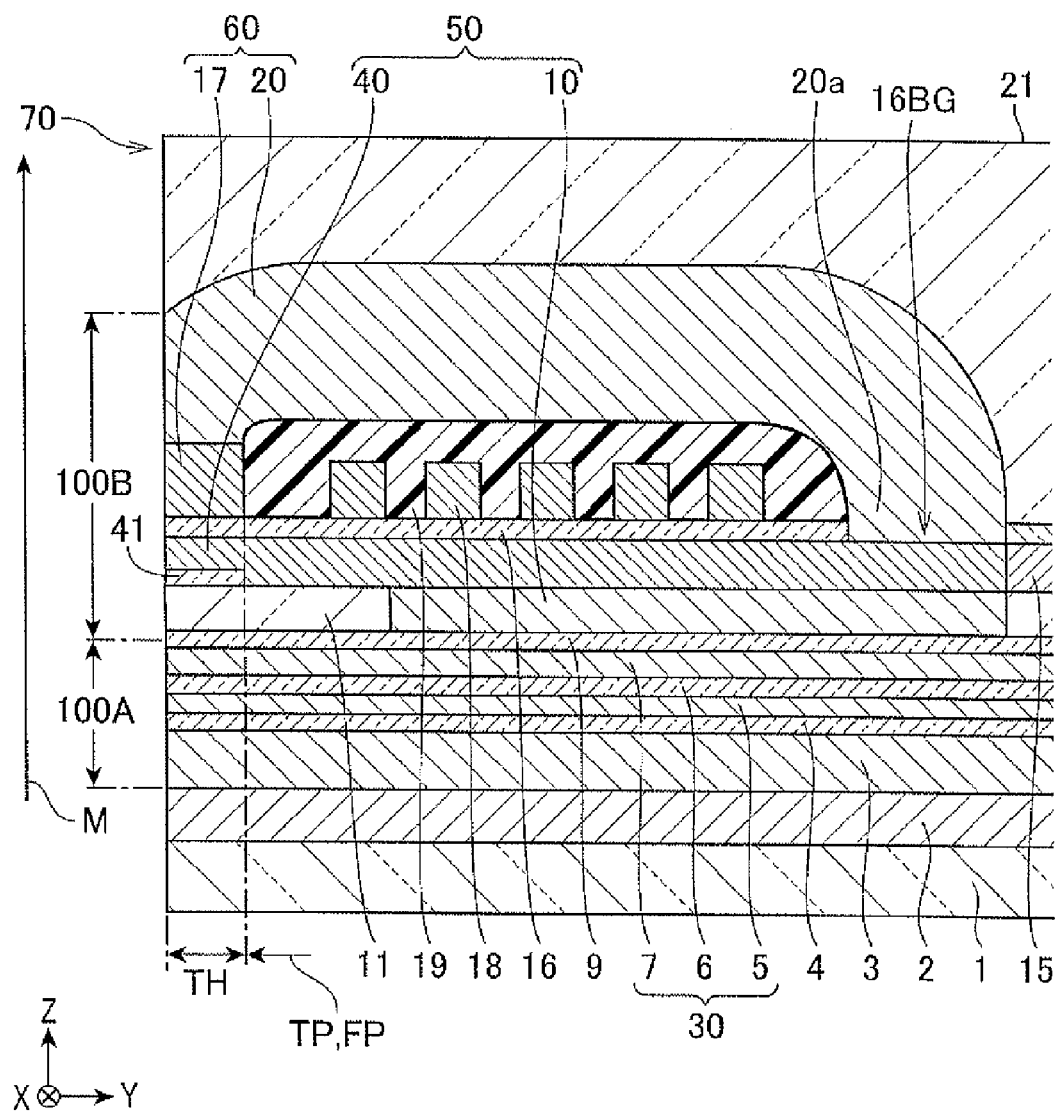
FIG. 6 is a cross-sectional view along line β-β in FIG. 4 for the magnetic head in one embodiment of the present invention.

The return yoke film 20 performs the function of circulating the magnetic flux and is configured, for example, from the magnetic material similar to that for the second write shield film 17. As illustrated in FIG. 6, at the trailing side of the write shield film 17, the return yoke film 20 extends from the air bearing surface 70 to the backgap 16BG via on the insulating film 19. The return yoke film 20 is coupled to the second write shield film 17 in the front part thereof and to the pole film 50 through the back gap 16BG in the rear part thereof.

The nonmagnetic film 21 protects the magnetic head and is configured, for example, from a nonmagnetic insulating material, such as alumina or the like.

Figure 7:
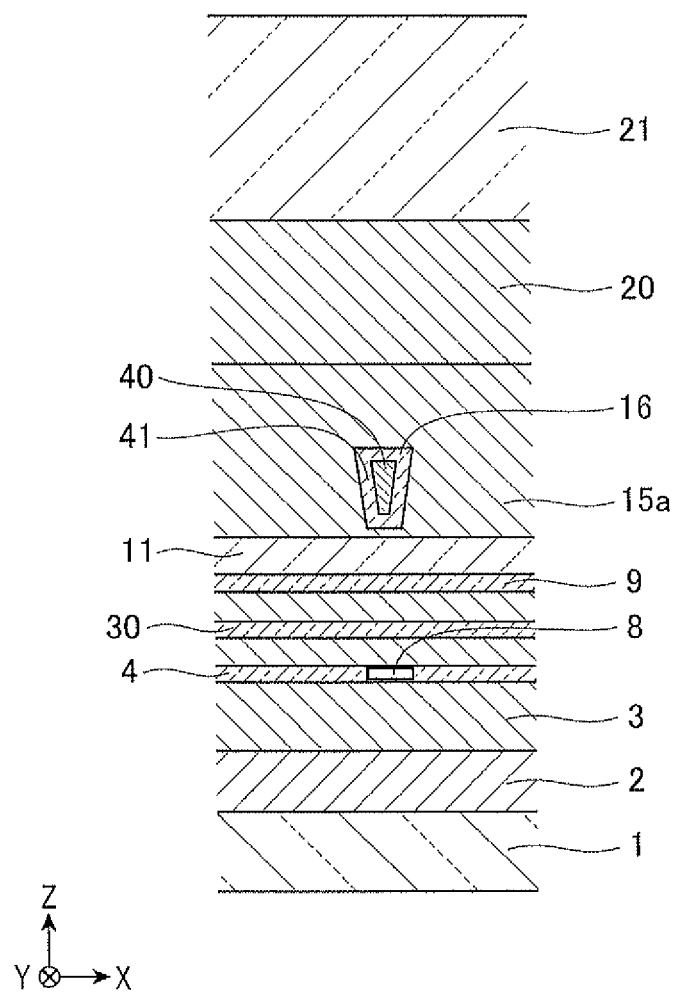
FIG. 7 is a cross-sectional view corresponding to FIG. 5 illustrating another exemplary configuration of a Wrap-Around structure magnetic head in one embodiment of the present invention.

FIG. 7 illustrates another configuration example of the wrap-around structure. In this configuration example, the periphery of the writing pole 40A is completely surrounded by the magnetic gap film 41 and the upper magnetic gap film 16 that are formed continuously, and a write shield film 15a that corresponds to the first and second write shields 15 and 17 is arranged in the periphery thereof. In other words, this configuration example includes a structure in which the writing pole 40A is embedded inside the write shield film 15a. The shield films positioned on both sides of the writing pole 40A function as side shield films, and the shield film positioned on the upper side functions as the second write shield film 17 illustrated in FIGS. 3 to 6.

In addition, this wrap-around structure is not limited to the above-described configuration. Various configurations can be adopted.

Figure 8:
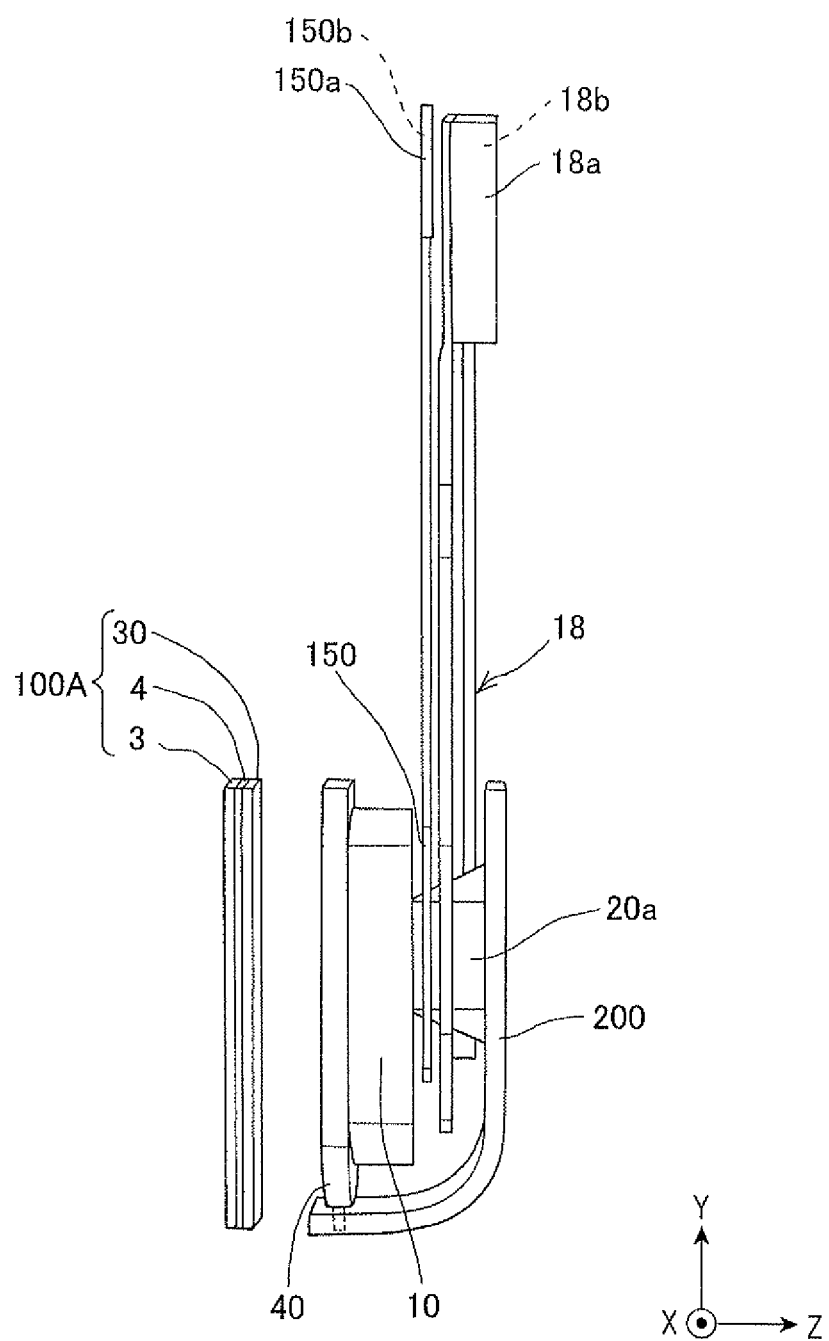
FIG. 8 illustrates a schematic configuration of a magnetic head provided with a sub-coil in one embodiment of the present invention.
Figure 9:
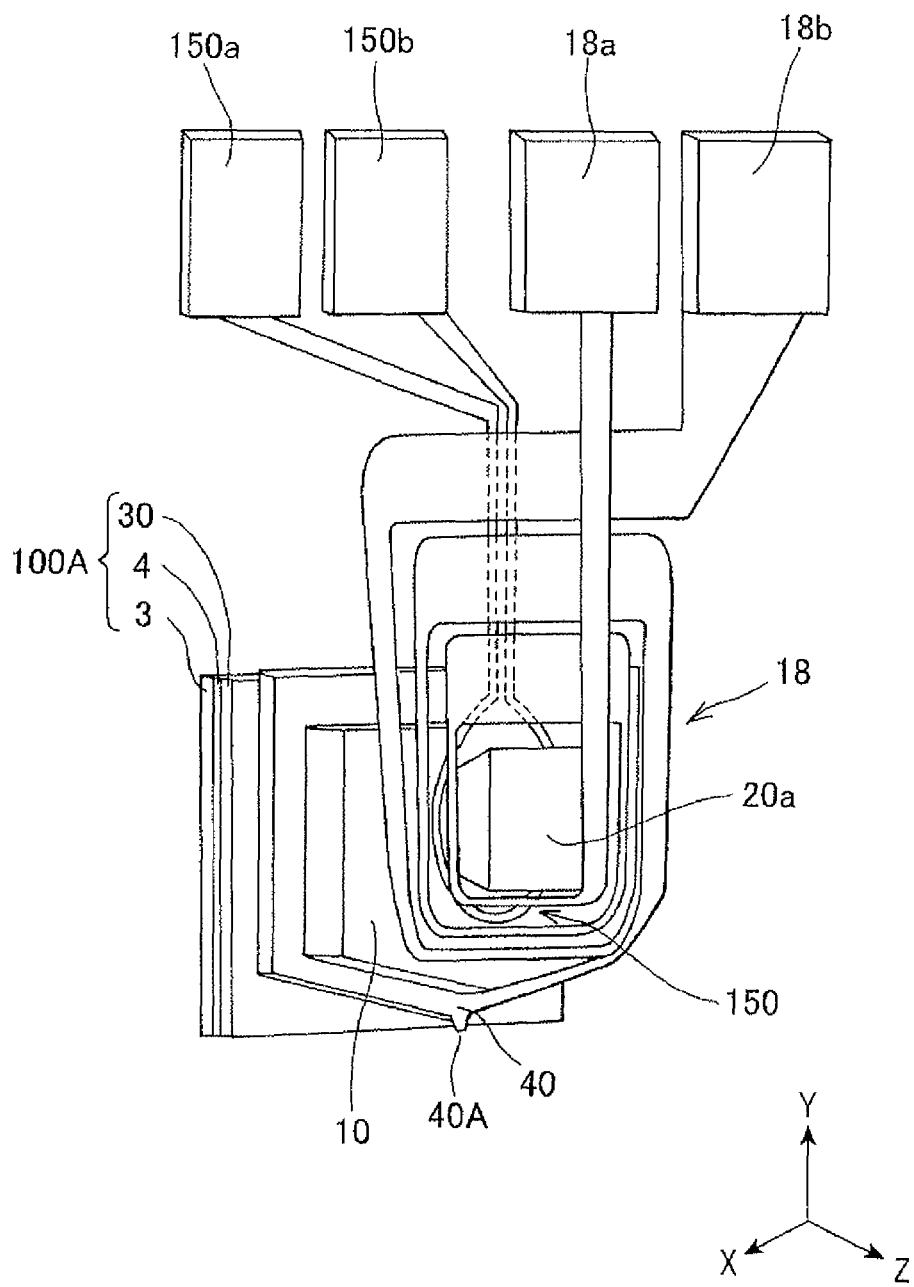
FIG. 9 is a perspective view in which the trailing shield 200 is excluded from the magnetic head illustrated in FIG. 8 for easier three-dimensional viewing of the configuration inside the magnetic head.
Figure 10:
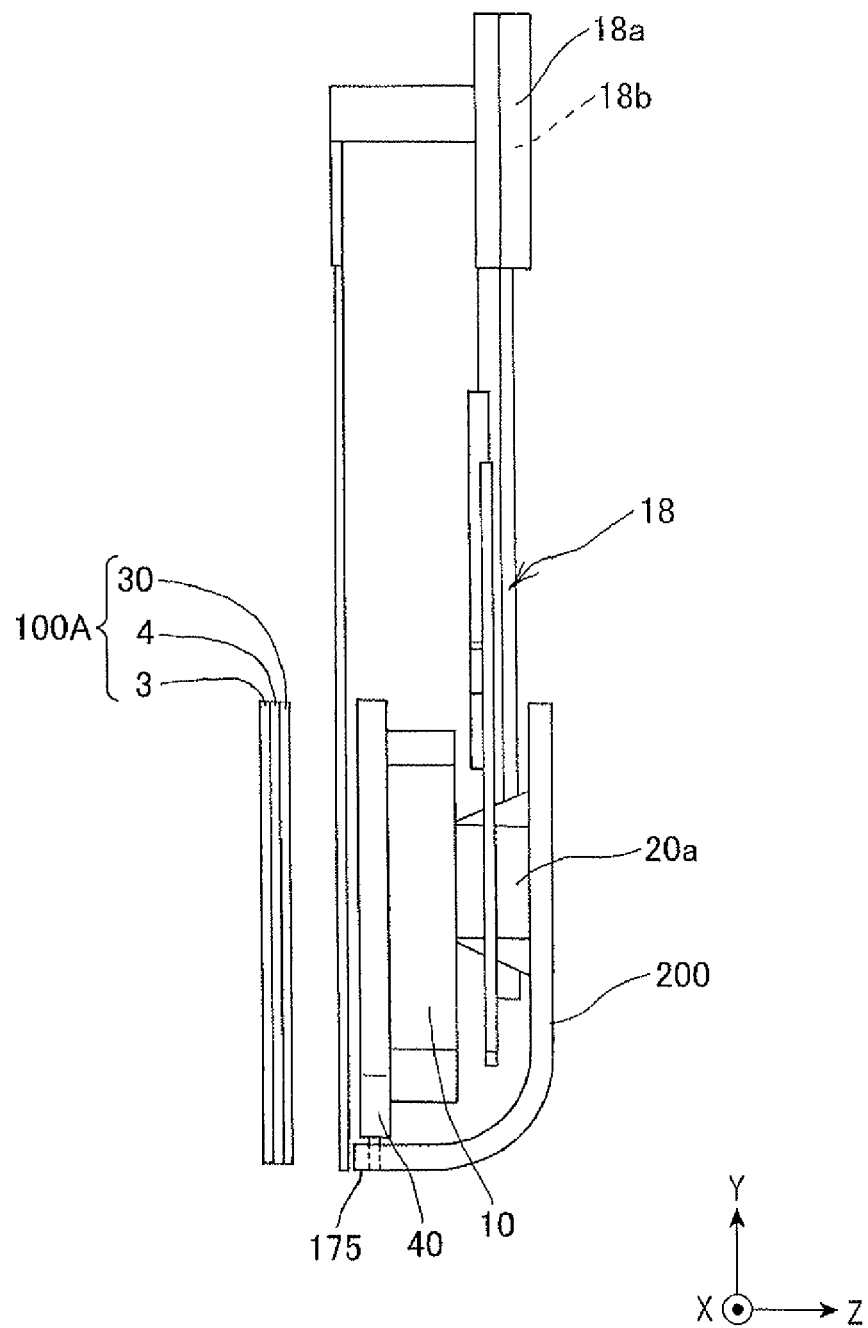
FIG. 10 illustrates a schematic configuration of a magnetic head provided with a microwave radiator in one embodiment of the present invention.
Figure 11:
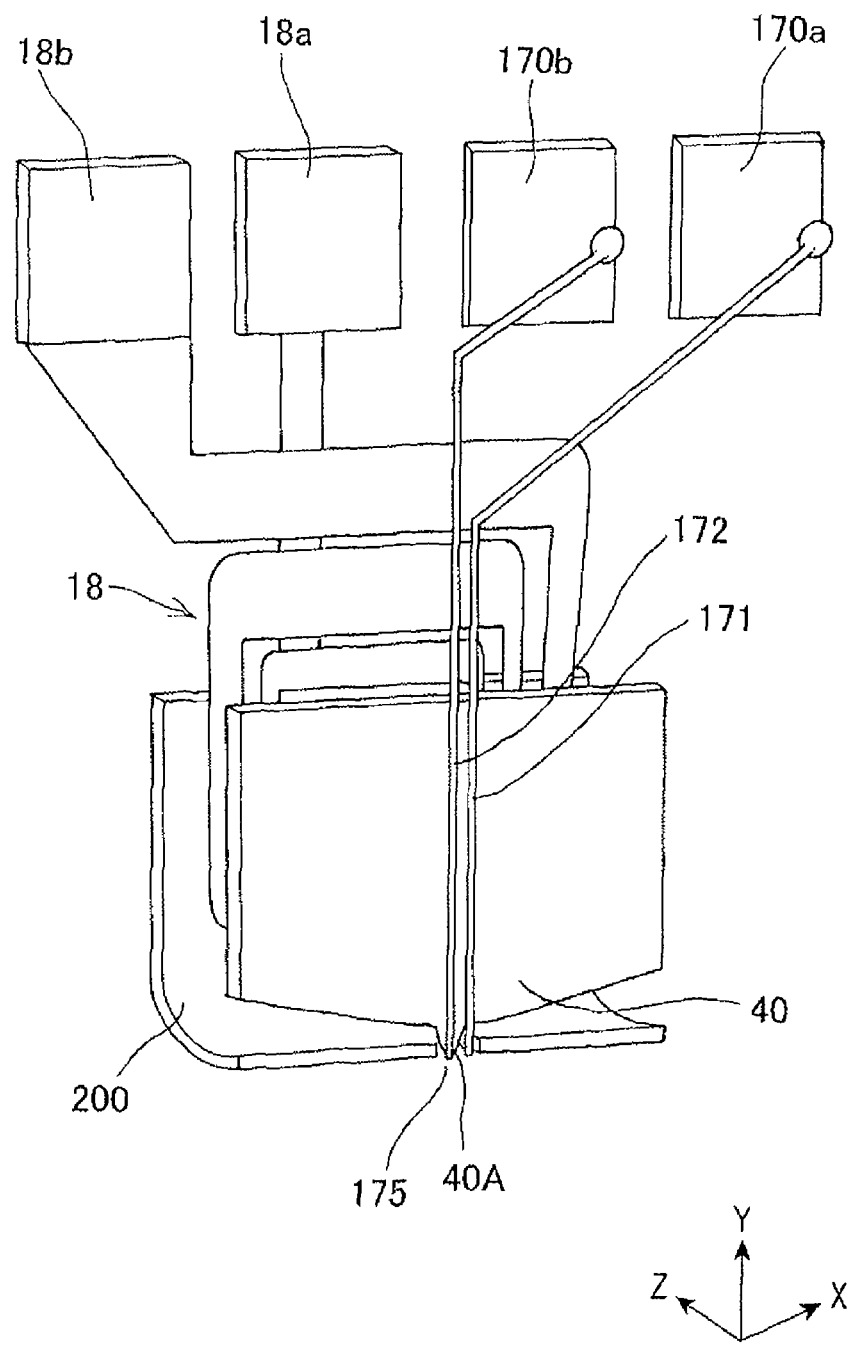
FIG. 11 is a perspective view in which the recording head part 100B is excluded from the magnetic head illustrated in FIG. 10 and which illustrates a view of a wiring structure inside the magnetic head that is connected to the microwave radiator from the removed recording head part 100B side.
Figure 12:
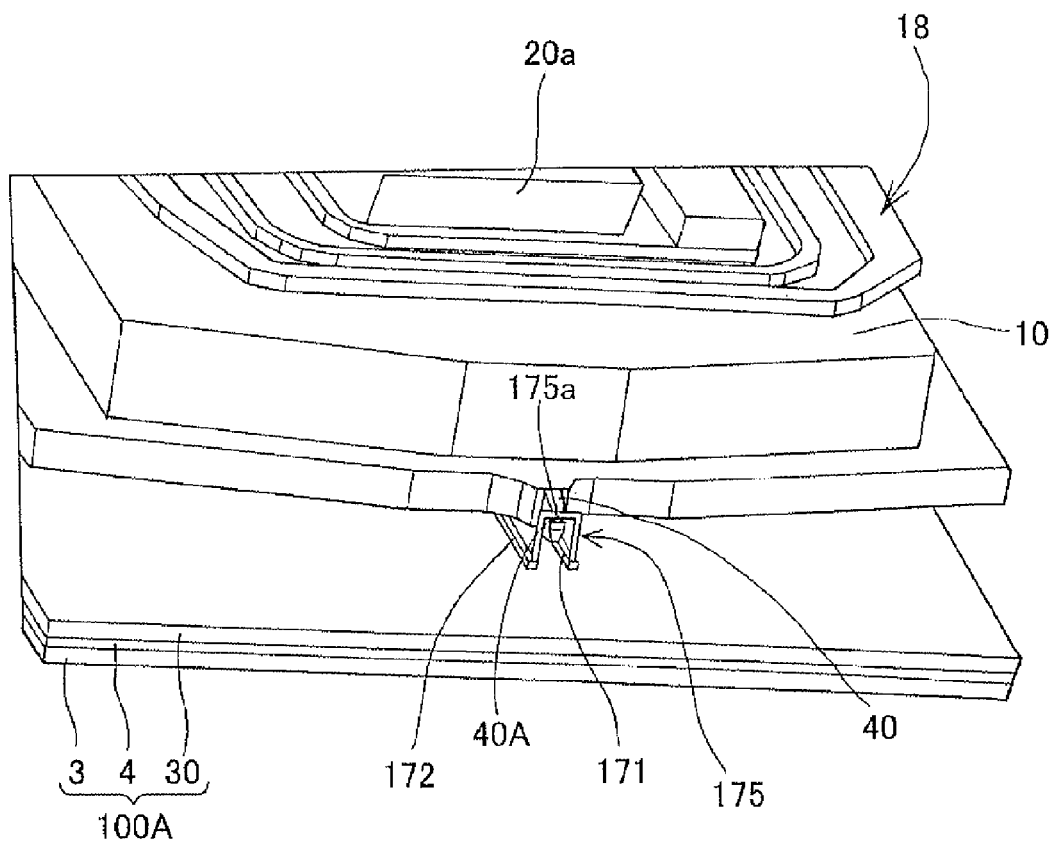
FIG. 12 is a perspective view in which the trailing shield 200 is excluded from the magnetic head provided with the microwave radiator to illustrate the air bearing surface side of the corresponding magnetic head in one embodiment of the present invention.
Figure 13:
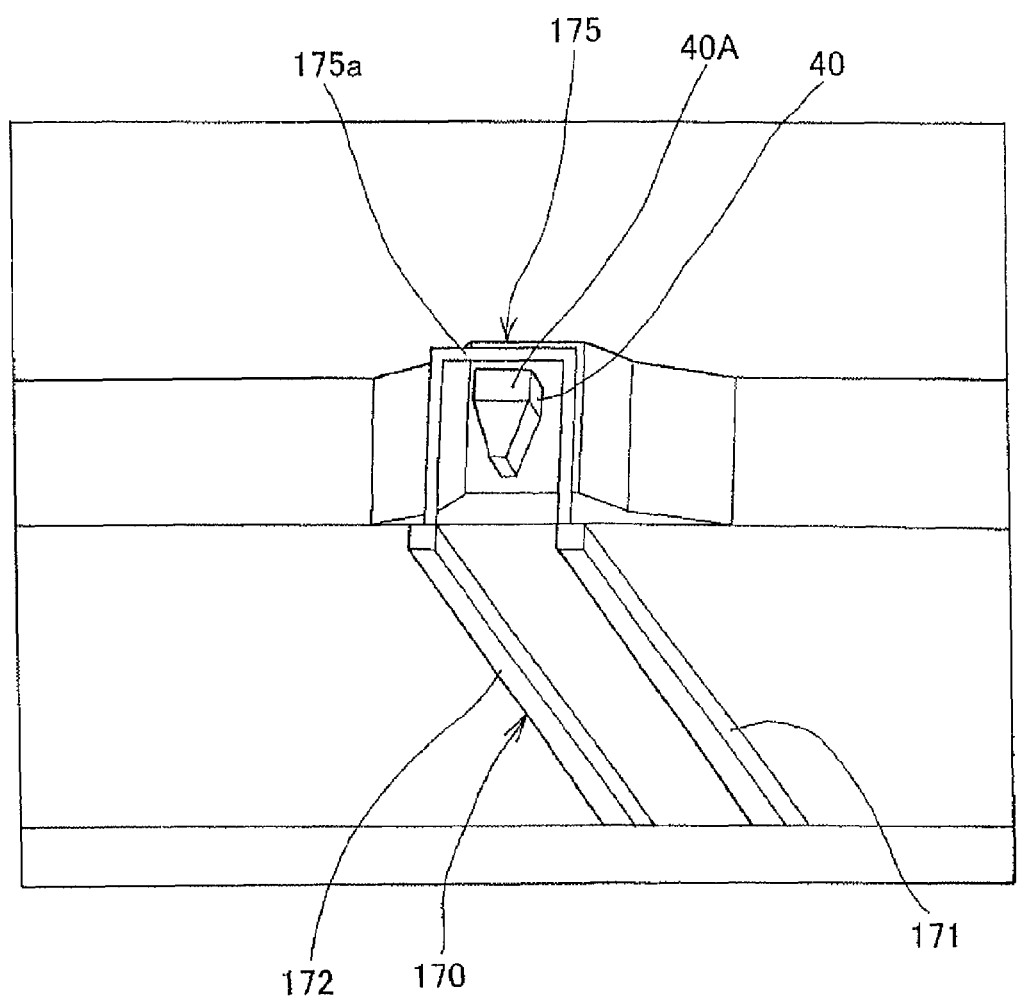
FIG. 13 is an enlarged perspective view of a vicinity of the microwave radiator in one embodiment of the present invention.

As illustrated in FIG. 8 and FIG. 9, the magnetic head of the present embodiment provides a sub-coil 150 between the main pole film 40 and the trailing shield 200 that corresponds to an auxiliary pole, and sub-coil bonding pads 150a and 150b connected to the sub-coil 150. By supplying amplitude modulated microwave alternating current to the sub-coil 150 to implement the magnetic recording method that relates to the present embodiment, an amplitude modulated in-plane alternate current magnetic field can be generated in the main pole film 40.

The sub-coil 150 is connected to the sub-coil bonding pads 150a and 150b so as to nearly encircle the coupling yoke 20a. Sub-coil electric circuits (not shown) that supply amplitude modulated microwave alternating current to the sub-coil 150 are connected to the sub-coil bonding pads 150a and 150b. Thereby, the amplitude modulated microwave alternating current is applied to the sub-coil 150 via the sub-coil bonding pads 150a and 150b to implement the magnetic recording method according to the present embodiment.

In addition, generally, in the manufacturing process of a magnetic head, the tip end of the sub-coil 150 is preferably positioned in a direction away from the magnetic recording medium by about 10 nm or greater than the tip end of the main pole film 40 in order to avoid the sub-coil 150 being polished because the writing pole 40a, which is the air bearing surface of the main pole film 40, is polished. Further, the thickness of the sub-coil 150 is preferably between 10 to 50 nm.

In the present embodiment as illustrated in FIG. 9, the sub-coil 150 is configured from a single winding, but the number of windings of the sub-coil 150 is not particularly limited and may be two or more windings. Further, although the sub-coil 150 is a single layer, it is not limited to that and a multilayer that accumulates two or more layers is also possible. Increasing the number of windings and the number of layers for the sub-coil 150 suppresses the microwave alternating current supply to the sub-coil 150 and also allows the in-plane alternate current magnetic field to be increased.

The magnetic head of the present embodiment may include a microwave radiator 175 configured from a conductive material, such as Cu, in place of the sub-coil 150 for generating the in-plane alternate current magnetic field on the main pole film 40.

As illustrated in FIG. 10 to FIG. 14, the microwave radiator 175 is configured of an inverted microstrip line (I-MLIN) and is arranged on the air bearing surface 70 of the magnetic head part 100B so as to oppose the magnetic recording medium. In addition, line conductors 171 and 172 are connected to the microwave radiator 175. These line conductors 171 and 172 are connected to microwave radiator bonding pads 170a and 170b. A microwave radiator electric circuit (not shown) that can supply amplitude modulated microwave alternating current to the microwave radiator 175 is connected to the microwave radiator bonding pads 170a and 170b. Thereby, the amplitude modulated microwave alternating current is applied to the microwave radiator 175 via the microwave radiator bonding pads 170a and 170b to implement the magnetic recording method that relates to the present embodiment.

The microwave radiator 175 has an approximate U shape so as to encompass the writing pole 40A. Moreover, the magnetic head in the present embodiment may also be configured so that the approximately U-shaped microwave radiator 175 may be slanted so that a direct line portion 175a of the approximate U shape is in closest proximity to the magnetic recording medium side. By so doing, the microwave radiation intensity can be increased in the essential closest proximity of the recording area in the writing pole 40A.

Figure 14:
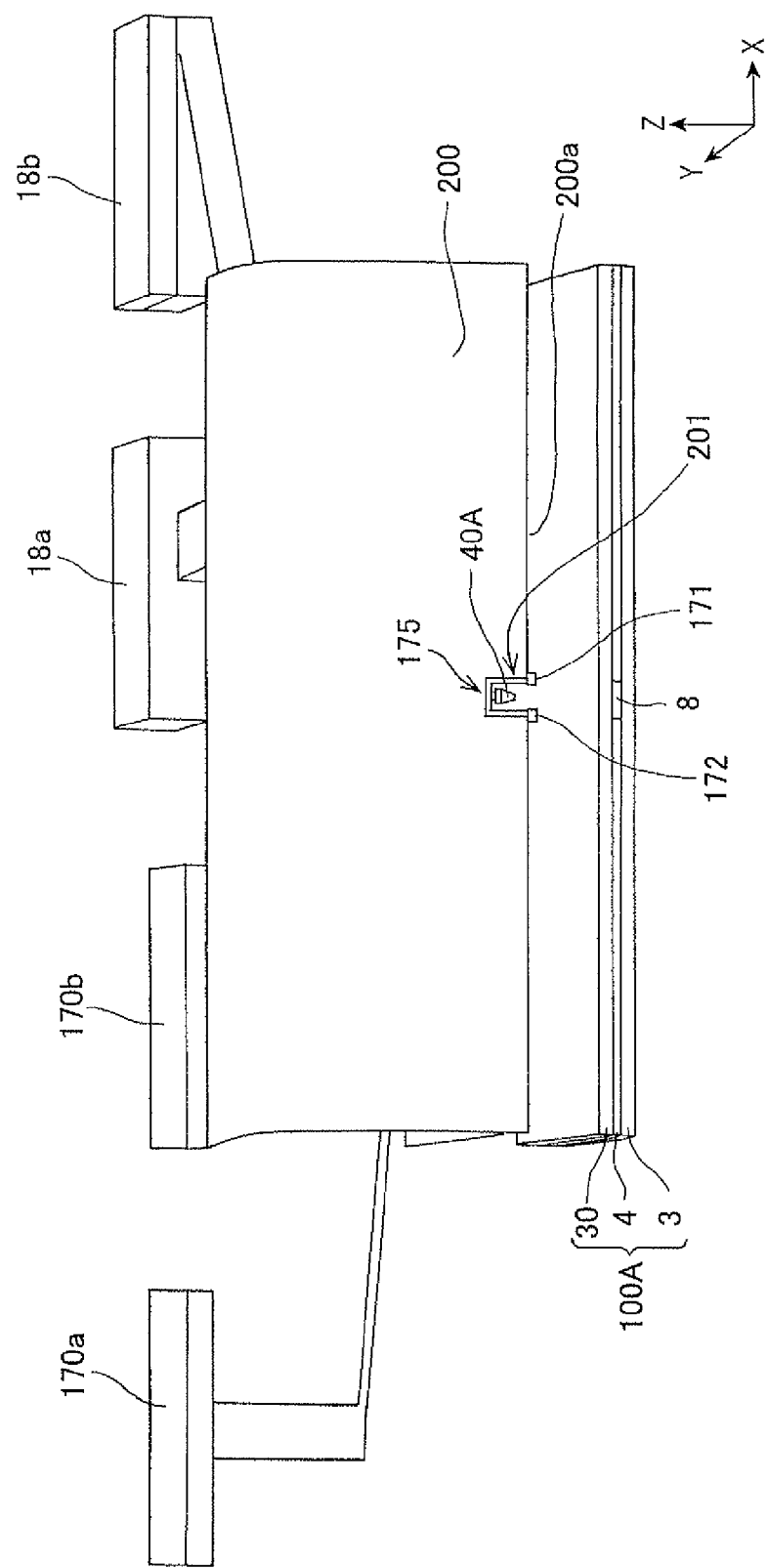
FIG. 14 is a perspective view illustrating the air bearing surface side of the magnetic head provided with the microwave radiator in one embodiment of the present invention.

As illustrated in FIG. 14, the magnetic head is on the air bearing surface side of the trailing shield 200, and for example, a notched part 201 in the shape of a square is formed on the end surface of the shield 200a so that the writing pole 40A and the microwave radiator 175 arranged at the periphery thereof can respectively be exposed to the air bearing surface.

Moreover, the microwave radiator 175 is the part for actually carrying out the function of radiating microwaves to the magnetic recording medium. In other words, the magnetic recording medium is a ground conductor via the air gap, and an electric power line is formed from the opposing microwave radiator 175 to the magnetic recording medium, and in conjunction with this, the in-plane alternate current magnetic field can be applied to the magnetic recording medium.

Figure 15:
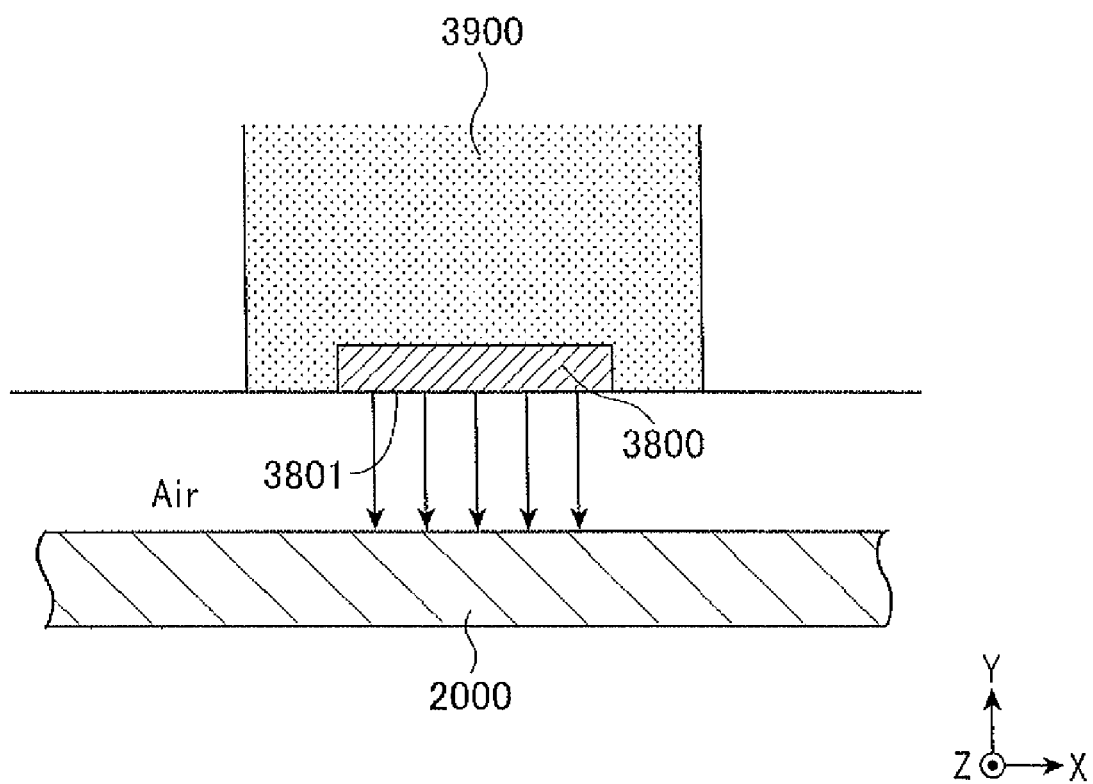
FIG. 15 is a cross-sectional view illustrating a modeled configuration of an inverted microstrip line (I-MLIN).

Further, with the inverted microstrip line (I-MLIN) configured of the microwave radiator 175, as illustrated in the simple model shown in FIG. 15, a transmission line 3800 of the radiator which is the microwave radiating body is embedded on one surface of a dielectric layer 3900, and the end part surface 3801 thereof is exposed to the air, and the magnetic recording medium 2000 is opposingly arranged so as to oppose the tip part thereof. Additionally, the magnetic recording medium 2000 performs the role of a so-called grand conductor, and electric power lines (indicated by the arrows in the drawing) are applied from the transmission line 3800 of the radiator that is the microwave radiating body, to the magnetic recording medium 2000, and an alternate current magnetic field is generated in a perpendicular direction to the electric power lines, that is to say, an in-plane alternate current magnetic field is applied to the magnetic recording medium 2000. Furthermore, the transmission line 3800 need not be partially embedded, but may be formed on the dielectric layer 3900.

Further, the magnetic head in the present embodiment is configured so that the maximum value of the in-plane alternate current magnetic field is smaller than the maximum value of the perpendicular recording magnetic field. Although there is the risk of lengthening the required time for magnetization reversal of the recording layer by the perpendicular recording magnetic field when the in-plane alternate current magnetic field is excessively large, by configuring the magnetic head so that the maximum value of the in-plane alternate current magnetic field is smaller than the maximum value of the perpendicular recording magnetic field, magnetization reversal or demagnetization can be efficiently performed in the area subject to recording of the recording layer.

By applying amplitude modulated microwave alternating current to the sub-coil 150 or to the microwave radiator 175 with this type of magnetic head, an amplitude modulated in-plane alternate current magnetic field is generated according to the amplitude of the microwave alternating current from the main pole film 40 and applied to the magnetic recording medium. In this state, the perpendicular recording magnetic field is applied to the magnetic recording medium from the main pole film 40 because direct current is supplied to the recording coil (main coil) 18. When the perpendicular recording magnetic field is applied, the amplitude of the microwave alternating current modulated so that the amplitude of the in-plane alternate current magnetic field is maximized, and thus the magnetization reversal field of the recording layer can be greatly reduced. Accordingly, a microwave assisting effect can be efficiently demonstrated even when the magnetic anisotropy energy of the recording layer of the magnetic recording medium is, for example, $1 \times 10^6$ erg/cm$^3$ or greater and has a high coercive force and can thereby efficiently perform magnetization reversal or demagnetization of the recording layer.

EXAMPLES

The present invention is described below in further detail by presenting examples and comparative examples. However, the present invention is not restricted to the following examples.

[Ratio of Carrier Frequency (fc) to Modulation Frequency (fm) in Amplitude Modulation]

A study was performed as described below on the change in waveform of an amplitude modulated microwave alternating current when varying the ratio (fc/fm) of carrier frequency (fc) to modulation frequency (fm) at the time of modulating the amplitude of microwave alternating current applied to a sub-coil or a microwave radiator. Further, the carrier frequency (fc) was fixed at 10 GHz, the amplitude of the carrier wave and modulation signal wave were the same ($A_0=1$), and the phase angles of the carrier wave and modulation signal wave were both 0 (rad).

Example 1

Figure 16:
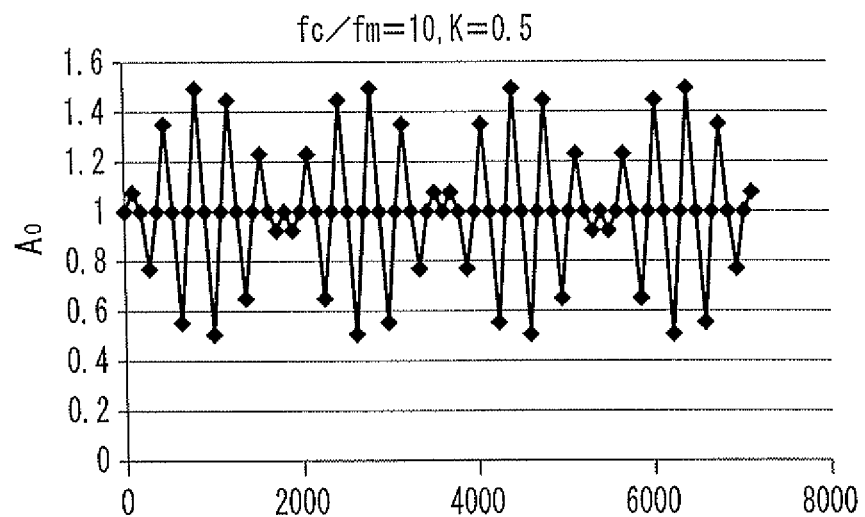
FIG. 16 illustrates the waveform of amplitude modulated microwave alternating current in the first embodiment (fc/fm=10, K=0.5).

Microwave alternating current supplied from a sub-coil electric circuit or a microwave radiator electric circuit and applied to a sub-coil or microwave radiator, underwent amplitude modulation. Further, the ratio (fc/fm) of carrier frequency (fc) to modulation frequency (fm) was 10, and the degree of modulation was 0.5. The results are shown in FIG. 16.

Example 2

Figure 17:
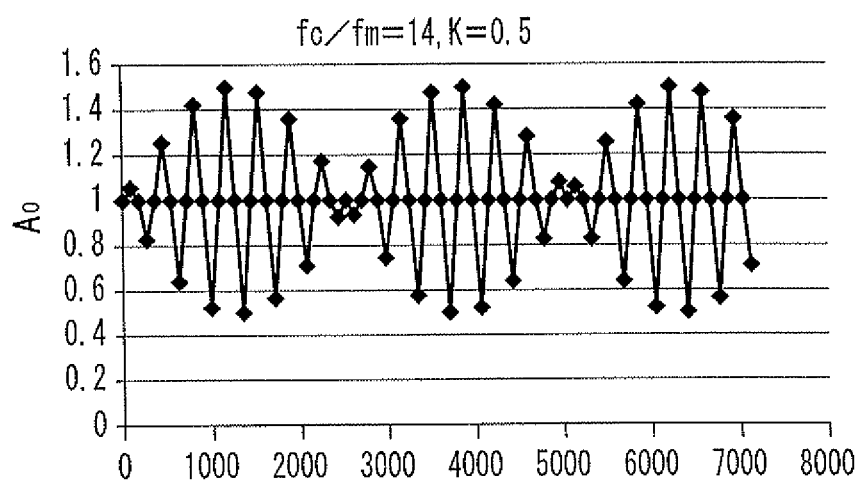
FIG. 17 illustrates the waveform of amplitude modulated microwave alternating current in the second embodiment (fc/fm=14, K=0.5).

Microwave alternating current underwent amplitude modulation in the same manner as in Example 1 except that the ratio (fc/fm) of carrier frequency (fc) to modulation frequency (fm) was 14. The results are shown in FIG. 17.

Example 3

Figure 18:
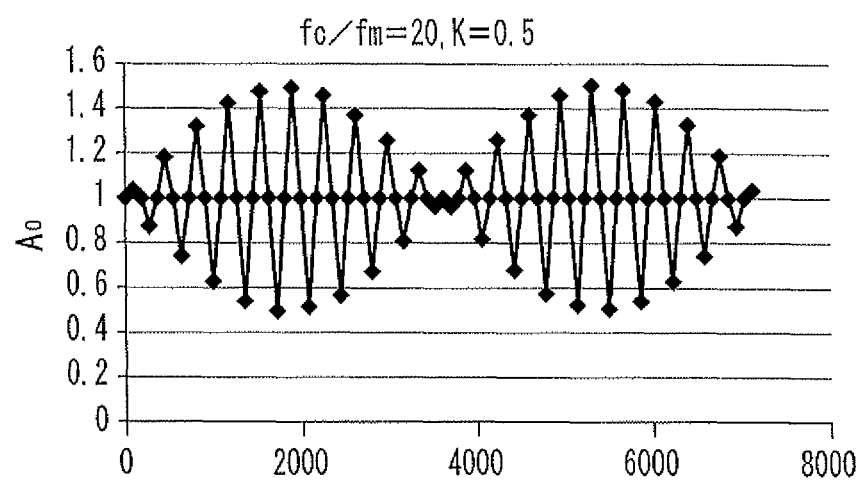
FIG. 18 illustrates the waveform of amplitude modulated microwave alternating current in the third embodiment (fc/fm=20, K=0.5).

Microwave alternating current underwent amplitude modulation in the same manner as in Example 1 except that the ratio (fc/fm) of carrier frequency (fc) to modulation frequency (fm) was 20. The results are shown in FIG. 18.

Example 4

Figure 19:
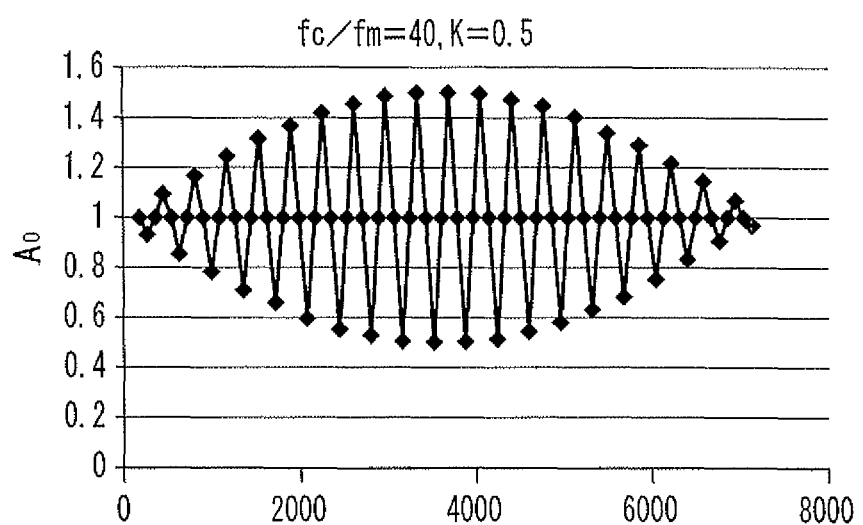
FIG. 19 illustrates the waveform of amplitude modulated microwave alternating current in the fourth embodiment (fc/fm=40, K=0.5).

Microwave alternating current underwent amplitude modulation in the same manner as in Example 1 except that the ratio (fc/fm) of carrier frequency (fc) to modulation frequency (fm) was 40. The results are shown in FIG. 19.

Comparative Example 1

Figure 20:
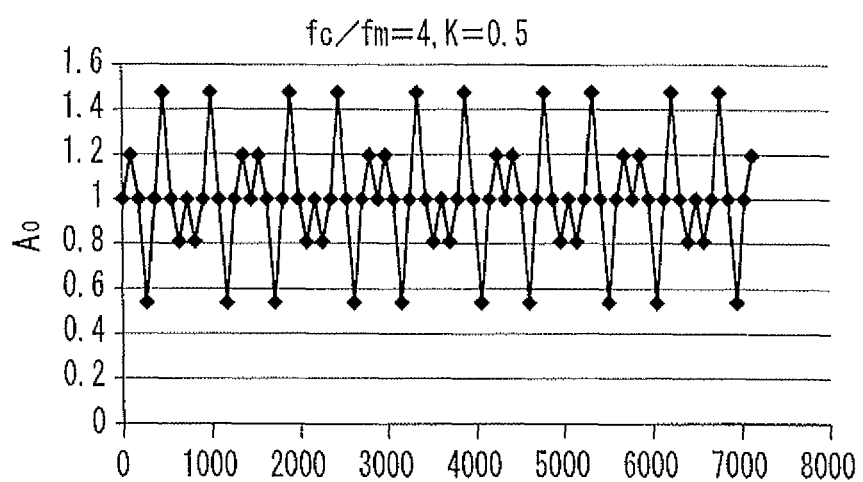
FIG. 20 illustrates the waveform of amplitude modulated microwave alternating current in the first comparative example (fc/fm=4, K=0.5).

Microwave alternating current underwent amplitude modulation in the same manner as in Example 1 except that the ratio (fc/fm) of carrier frequency (fc) to modulation frequency (fm) was 4. The results are shown in FIG. 20.

Comparative Example 2

Microwave alternating current underwent amplitude modulation in the same manner as in Example 1 except that the ratio (fc/fm) of carrier frequency (fc) to modulation frequency (fm) was 7. The results are shown in FIG. 21.

FIG. 16 to FIG. 21 illustrate the waveform (input waveform of the microwave alternating current input into a current amplifier in the microwave assisted magnetic recording head) of amplitude modulated microwave alternating current described above. Moreover, in the drawings, the vertical axis represents standardized amplitude $A_0$, and the horizontal access represents time (discretionary scale).

Evident from FIG. 16 to FIG. 19 is that making the ratio (fc/fm) of carrier frequency (fc) to modulation frequency (fm) to be 10 to 40 confirmed that microwave alternating current with the ability to contribute to magnetization reversal of a recording layer exceeds four cycles and is sufficient for exciting precession movement. In addition, because polarity of the microwave alternating current after magnetization reversal has dual polarity, it is possible to confirm that magnetization reversal of a recording layer can stably converge.

Figure 21:
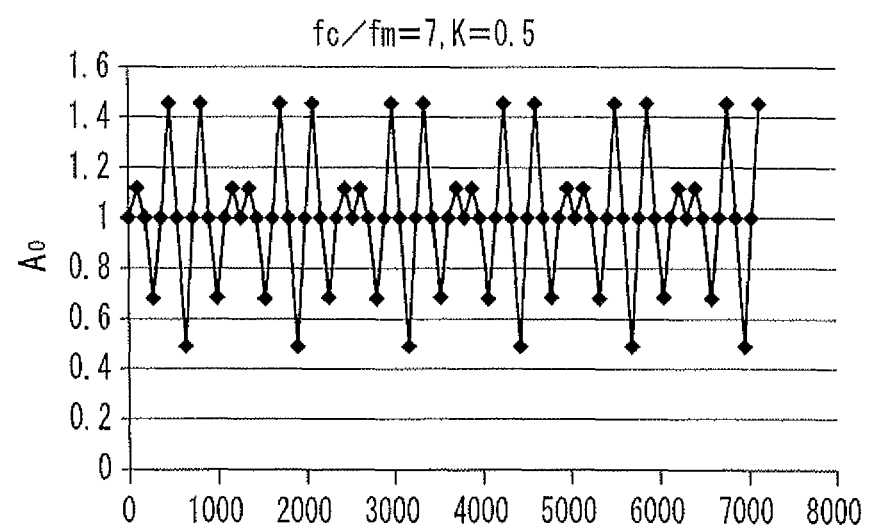
FIG. 21 illustrates the waveform of amplitude modulated microwave alternating current in the second comparative example (fc/fm=7, K=0.5).

Meanwhile, as evident from FIG. 20 and FIG. 21, it is confirmed that when the ratio (fc/fm) of carrier frequency (fc) to modulation frequency (fm) is less than 10, (the carrier wave of) microwave alternating current with the ability to contribute to magnetization reversal of a recording layer is about 1 to 2 cycles, and that it is insufficient for exciting precession movement. In addition, because polarity of (the carrier wave of) the microwave alternating current after magnetization reversal is single polarity, it is possible to confirm that magnetization reversal of a recording layer is difficult to stably converge.

[Degree of Modulation in Amplitude Modulation]

A study was performed as described below on the change in waveform of famplitude modulated microwave alternating current when varying the degree of modulation (K) at the time of modulating the amplitude of microwave alternating current applied to a sub-coil or a microwave radiator. Further, the carrier frequency (fc) was 10 GHz, the amplitude of the carrier wave and modulation signal wave were the same ($A_0$=1), and the phase angles of the carrier wave and modulation signal wave were both 0 (rad).

Example 5

Figure 22:
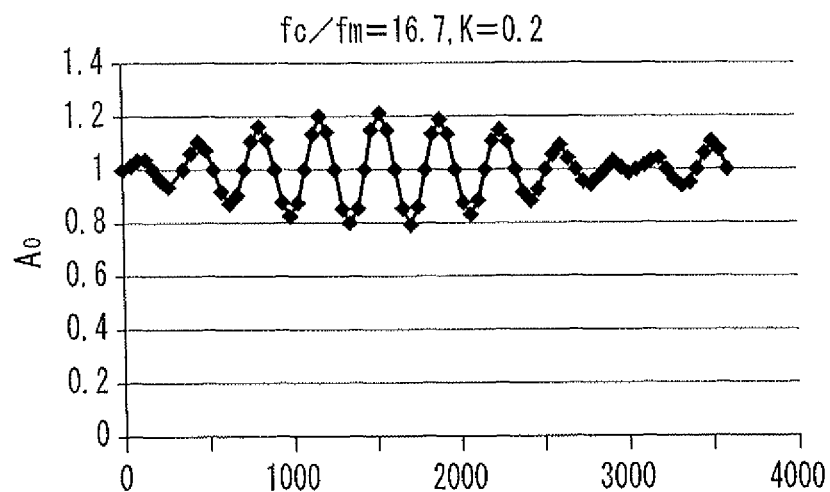
FIG. 22 illustrates the waveform of amplitude modulated microwave alternating current in the fifth embodiment (fc/fm=16.7, K=0.2).

Microwave alternating current supplied from a sub-coil electric circuit or a microwave radiator electric circuit and applied to a sub-coil or microwave radiator, underwent amplitude modulation. Further, the ratio (fc/fm) of carrier frequency (fc) to modulation frequency (fm) was 16.7, and the degree of modulation was 0.2. The results are shown in FIG. 22.

Example 6

Figure 23:
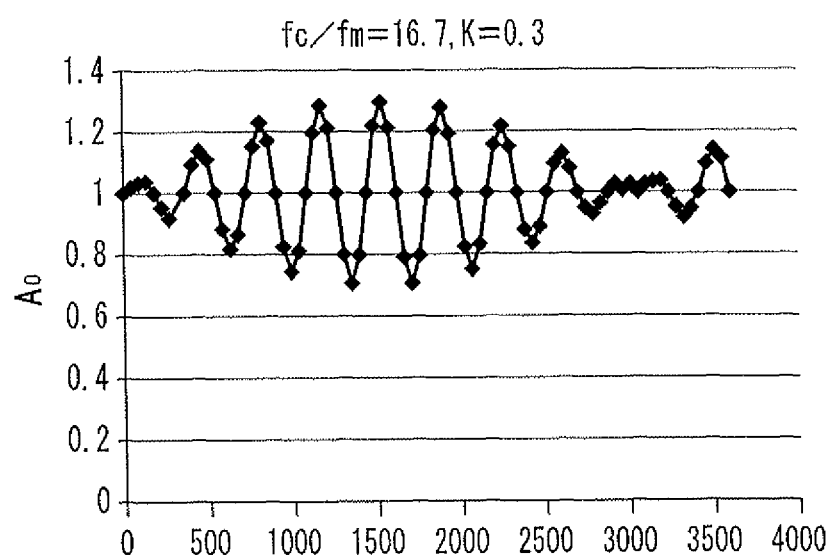
FIG. 23 illustrates the waveform of amplitude modulated microwave alternating current in the sixth embodiment (fc/fm=16.7, K=0.3).

Microwave alternating current underwent amplitude modulation in the same manner as in Example 5 except that the degree of modulation (K) was 0.3. The results are shown in FIG. 23.

Example 7

Figure 24:
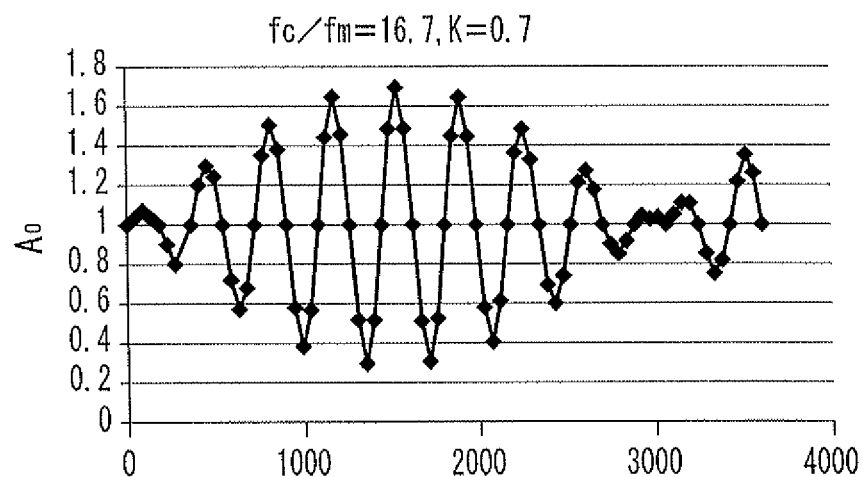
FIG. 24 illustrates the waveform of amplitude modulated microwave alternating current in the seventh embodiment (fc/fm=16.7, K=0.7).

Microwave alternating current underwent amplitude modulation in the same manner as in Example 5 except that the degree of modulation (K) was 0.7. The results are shown in FIG. 24.

Example 8

Figure 25:
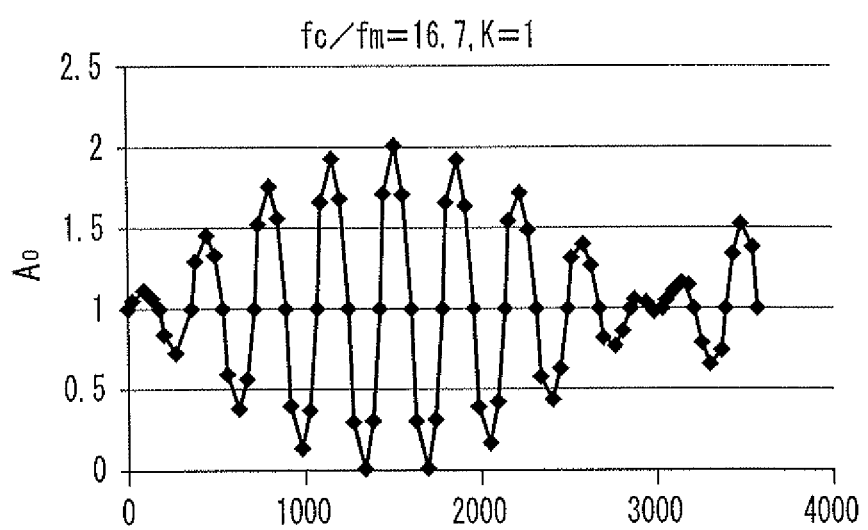
FIG. 25 illustrates the waveform of amplitude modulated microwave alternating current in the eighth embodiment (fc/fm=16.7, K=1.0).

Microwave alternating current underwent amplitude modulation in the same manner as in Example 5 except that the degree of modulation (K) was 1.0. The results are shown in FIG. 25.

Example 9

Figure 26:
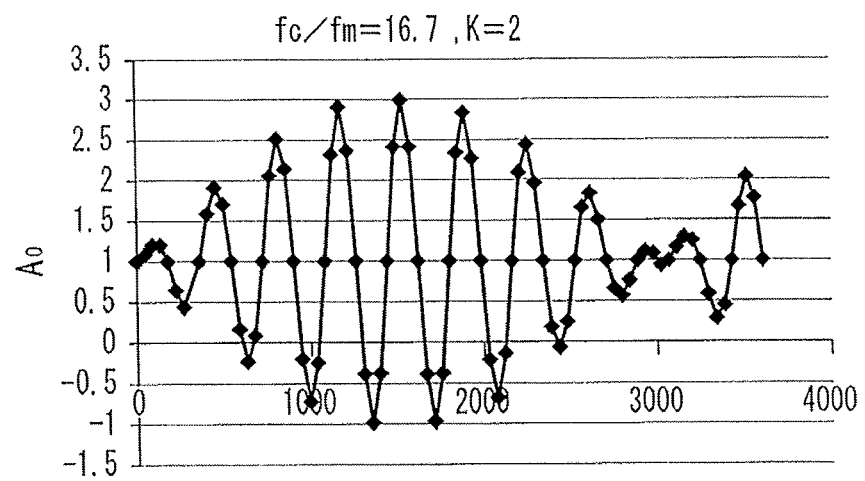
FIG. 26 illustrates the waveform of amplitude modulated microwave alternating current in the ninth embodiment (fc/fm=16.7, K=2.0).

Microwave alternating current underwent amplitude modulation in the same manner as in Example 5 except that the degree of modulation was 2.0. The results are shown in FIG. 26.

FIG. 23 to FIG. 26 illustrate the waveform (input waveform of the microwave alternating current input to into a current amplifier in the microwave assisted magnetic recording head) of amplitude modulated microwave alternating current described above. Moreover, within the drawings, the vertical axis indicates standardized amplitude $A_0$, and the horizontal access indicates time (discretionary scale).

As Evident from FIG. 22 to FIG. 26, the dynamic range (ratio of maximum amplitude to minimum amplitude) can be increased as the size of the degree of modulation K increases. In addition, the instantaneous maximum power for exciting the precession movement can be increased. As a result, a high assistance effect in can be achieved.

What is claimed is:
1. A method for magnetic recording using a magnetic recording head to a recording layer of a magnetic recording medium arranged to oppose the magnetic recording head, the magnetic recording head including a main pole, an auxiliary pole, a main coil for generating a perpendicular recording magnetic field to the main pole, and either a sub-coil for generating an in-plane alternate current magnetic field of a microwave band to the main pole or a microwave radiator that is arranged in vicinity of the main pole and that radiates microwaves, the method comprising:
   a step for modulating an amplitude of the in-plane alternate current magnetic field by modulating an amplitude of microwave alternating current that is applied to either the sub-coil or the microwave radiator using a modulation signal wave so that a ratio (fc/fm) of a carrier frequency (fc) to a modulation frequency (fm) is from 10 to 40; and
   a step for performing magnetic recording to the recording layer of the magnetic recording medium by applying the perpendicular recording magnetic field while applying the in-plane alternate current magnetic field with the modulated amplitude to the magnetic recording medium.
2. The magnetic recording method according to claim 1, wherein in the step for modulating the amplitude of the in-plane alternate current magnetic field, a degree of modulation is from 0.5 to 3.2 when the amplitude of the microwave alternating current is modulated.

3. The magnetic recording method according to claim 1, wherein
when the perpendicular recording magnetic field is applied to the magnetic recording medium in the step for performing magnetic recording, the amplitude of the microwave alternating current is modulated so that the amplitude of the microwave alternating current after amplitude modulation is maximized.

4. The magnetic recording method according to claim 1, wherein
the recording layer of the magnetic recording medium is configured of material having magnetic anisotropy energy of $1 \times 10^6$ erg/cm$^3$ or greater.

* * * * *